US012752160B2

(12) United States Patent
Whalen et al.

(10) Patent No.: US 12,752,160 B2
(45) Date of Patent: Oct. 6, 2026

(54) DIFFERENTIAL AIR PRESSURE (DAP) SYSTEM, RELATED DEVICES AND METHODS

(71) Applicants: Boost Treadmills, Palo Alto, CA (US); Robert Tremaine Whalen, Palo Alto, CA (US)

(72) Inventors: Sean Tremaine Whalen, Mountain View, CA (US); Thomas Jack Waldo Allen, Palo Alto, CA (US); Robert Tremaine Whalen, Los Altos, CA (US); Jan R. Black, Bountiful, UT (US); Nicole Pasdera, Sandy, UT (US)

(73) Assignee: BOOST TREADMILLS, LLC, Palo Alto, CA (US)

( * ) Notice: Subject to any disclaimer, the term of this patent is extended or adjusted under 35 U.S.C. 154(b) by 0 days.

(21) Appl. No.: 19/286,794

(22) Filed: Jul. 31, 2025

(65) Prior Publication Data

US 2026/0054133 A1 Feb. 26, 2026

Related U.S. Application Data

(62) Division of application No. PCT/US2025/021207, filed on Mar. 24, 2025.

(Continued)

(51) Int. Cl.
*A63B 24/00* (2006.01)
*A63B 22/02* (2006.01)

(Continued)

(52) U.S. Cl.
CPC .......... *A63B 24/0087* (2013.01); *A63B 22/02* (2013.01); *A63B 69/0028* (2013.01);

(Continued)

(58) Field of Classification Search
CPC . A63B 24/0087; A63B 22/02; A63B 69/0028; A63B 2071/0625;

(Continued)

(56) References Cited

U.S. PATENT DOCUMENTS 7,762,930 B2 * 7/2010 Egger .................. A61H 1/0237 482/57
9,314,393 B2 * 4/2016 Kim ................... A61N 1/36031

(Continued)

FOREIGN PATENT DOCUMENTS

CA 3091651 C * 11/2023 ....... A63B 21/00181
WO WO-2009051750 A1 * 4/2009 ............. A63B 22/02

(Continued)

OTHER PUBLICATIONS

International Search Report and Written Opinion issued in corresponding PCT Application Serial No. PCT/US2025/021207 dated Jul. 9, 2025 (24 pages).

*Primary Examiner* — Andrew M Kobylarz
(74) *Attorney, Agent, or Firm* — Kevin Paganini, Esq.

(57) ABSTRACT

A Differential Air Pressure (DAP) disguised as an amusement system is provided for motivating user participation in exercise session activities of the DAP system. The DAP system has a support platform with a treadmill integrated therein, and includes an inflatable enclosure secured at a base end to the support platform that extends upward therefrom in an inflated state to a vertical height for the exercise session, which has shape features corresponding with the amusement system disguise. A restraint securely connected to the support platform at a base portion and connected to a top opening defined through an upper region of the inflatable enclosure restrains the top opening at a vertical height in an inflated state. A control computer controls the DAP system to perform operations correspond- (Continued)

ing with the disguised appearance and further include operations for at least partially unweighting the user for the exercise session.

9 Claims, 26 Drawing Sheets

Related U.S. Application Data

(60) Provisional application No. 63/715,729, filed on Nov. 4, 2024, provisional application No. 63/569,190, filed on Mar. 24, 2024.

(51) Int. Cl.
*A63B 69/00* (2006.01)
*A63B 71/06* (2006.01)
*A63F 13/816* (2014.01)

(52) U.S. Cl.
CPC .... *A63F 13/816* (2014.09); *A63B 2071/0625* (2013.01); *A63B 2208/053* (2013.01); *A63B 2225/093* (2013.01); *A63B 2225/62* (2013.01); *A63B 2225/74* (2020.08)

(58) Field of Classification Search
CPC ........ A63B 2208/053; A63B 2225/093; A63B 2225/62; A63B 2225/74; A63F 13/816
See application file for complete search history.

(56) References Cited

U.S. PATENT DOCUMENTS

| | | | | |
|---|---|---|---|---|
| 9,370,680 | B1 * | 6/2016 | Macaulay | A63B 71/023 |
| 10,342,461 | B2 * | 7/2019 | Basta | A61B 5/1038 |
| 11,654,327 | B2 * | 5/2023 | Phillips | A63B 22/02 482/5 |
| 11,806,564 | B2 * | 11/2023 | Basta | A63B 21/00181 |
| 12,064,662 | B2 * | 8/2024 | Bayerlein | A63B 22/025 |
| 12,194,336 | B2 * | 1/2025 | Whalen | A63B 22/02 |
| 12,239,595 | B2 * | 3/2025 | Kuehne | A63B 21/00181 |
| 12,263,367 | B2 * | 4/2025 | Whalen | A63B 22/02 |
| 2002/0025889 | A1 | 2/2002 | Egger | |
| 2004/0212240 | A1 * | 10/2004 | Zwezdaryk | A47C 15/008 297/440.1 |
| 2009/0023556 | A1 * | 1/2009 | Daly | A63B 24/0062 482/9 |
| 2014/0113775 | A1 * | 4/2014 | Egan | A63B 21/00181 482/54 |
| 2015/0379239 | A1 * | 12/2015 | Basta | A63B 22/02 434/247 |
| 2017/0065478 | A1 | 3/2017 | Takashima | |
| 2017/0128769 | A1 * | 5/2017 | Long | A61G 10/02 |
| 2019/0255381 | A1 * | 8/2019 | Bayerlein | A63B 22/025 |
| 2019/0392939 | A1 * | 12/2019 | Basta | G16H 20/30 |
| 2020/0221975 | A1 * | 7/2020 | Basta | A63B 24/0075 |
| 2021/0187347 | A1 * | 6/2021 | Remsberg | A63B 22/02 |
| 2021/0205165 | A1 * | 7/2021 | Kuehne | A63B 21/068 |
| 2022/0288439 | A1 * | 9/2022 | Whalen | A63B 21/00181 |
| 2022/0401782 | A1 * | 12/2022 | Whalen | A63B 21/4009 |
| 2023/0109901 | A1 * | 4/2023 | Whalen | A63B 21/4033 482/142 |
| 2023/0115873 | A1 * | 4/2023 | Whalen | A63B 22/02 482/54 |
| 2023/0158363 | A1 | 5/2023 | Bayerlein et al. | |
| 2024/0082630 | A1 | 3/2024 | Phillips et al. | |
| 2024/0130917 | A1 * | 4/2024 | Kuehne | A63B 71/0009 |
| 2025/0099812 | A1 * | 3/2025 | Whalen | A63B 24/0062 |

FOREIGN PATENT DOCUMENTS

| | | | | |
|---|---|---|---|---|
| WO | WO-2015195983 A1 * | 12/2015 | A63B 71/0622 |
| WO | WO-2019089850 A1 * | 5/2019 | A63B 24/0087 |

* cited by examiner

PRIOR ART

PRIOR ART

FIG. 19A
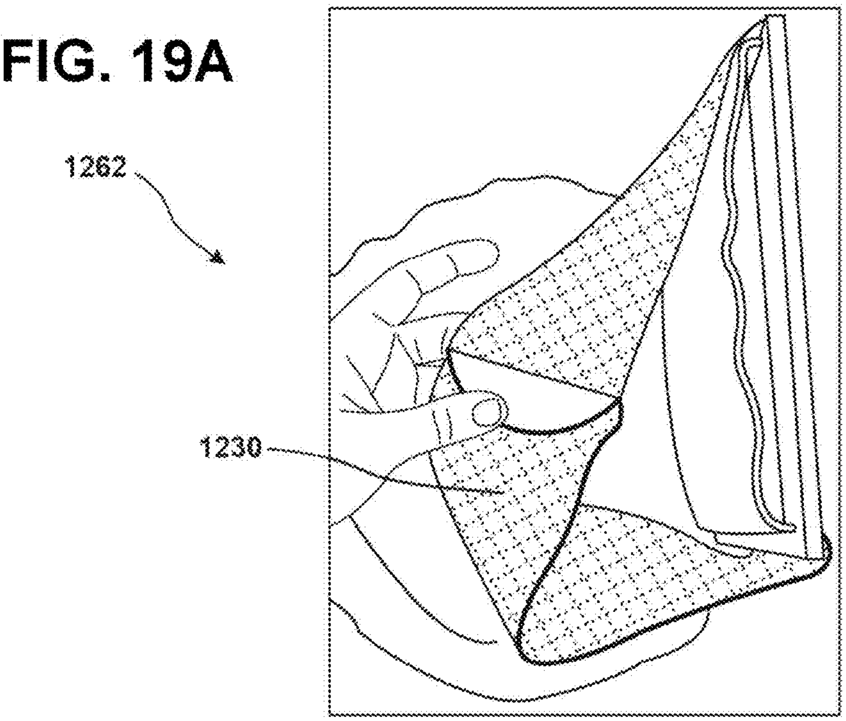
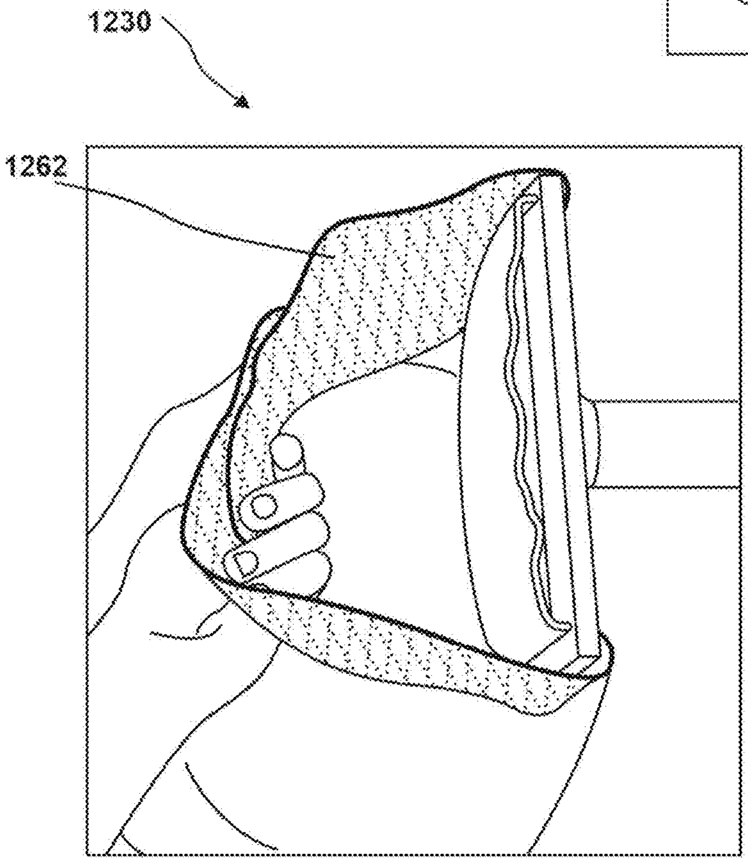
FIG. 19B

DIFFERENTIAL AIR PRESSURE (DAP) SYSTEM, RELATED DEVICES AND METHODS

CROSS-REFERENCE TO RELATED APPLICATIONS

This application is a divisional of International Patent Application No. PCT/US25/21207 (published as WO 2025/207547) filed on Mar. 24, 2025, which claims the benefit of U.S. Provisional Patent Application No. 63/569,190 filed Mar. 24, 2024 and U.S. Provisional Patent Application No. 63/715,729 filed on Nov. 4, 2024, each of which is incorporated by reference herein in its entirety.

BACKGROUND

Aspects, features, and concepts described herein relate to supplemental equipment for exercise and rehabilitation devices, and particularly to equipment known as unweighting, antigravity, or differential air pressure (DAP) systems, devices and method, as well as to related devices, systems and methods for use with DAP systems and devices. Further, aspects, features and concepts herein are directed to unweighting exercise and rehabilitation devices for low height users, such as children and adolescents.

Systems for unweighting individuals for rehabilitation and fitness training have been a popular modality. Traditional methods have included aquatic training and using a hoist to lift a person or animal off a walking surface. Harness and hoist systems provide benefits related to their historical use in that they are well-known and can also allow for precise and granular unweighting, but become significantly uncomfortable at off-loading greater than about 25% of normal body weight. Further, aquatic systems can be difficult to control in terms of degree of off-loading, and are cumbersome to use along with having large space and resource requirements.

Systems that create a pressure differential can vary pressure differentials more precisely and are easier to use allowing for a wide range of unloading in small steps. One benefit of this is in the case of rehabilitation, for which it has been shown that increments as small as 1% of normal body weight can effectively determine and bypass a pain threshold below which a user can exercise pain free. More recently, systems creating a pressure differential across a portion of a user have been developed and are generally in commercial use in the rehabilitation and training centers around the world. These systems apply a pressure difference at a portion of the user's body with a net force at the center of pressure. If the net pressure differential is oriented parallel with the force of gravity and located near the user's waist, this off-loading force acts approximately directly counter to the force of gravity and therefore alters the user's natural gait patterns.

DAP systems have been commercialized by companies like Showa Denki in Japan, Sasta Fitness of the UK, Vacuwell of Poland, and AlterG Inc. in the US. While these systems offer benefits, they are expensive, large, non-adjustable, require specialized power sources, or are generally limited in access to the market because of the high cost and space burden, or general discomfort in design for users of different body types or heights.

Conventional DAP systems rely on the use of a shell placed around an existing treadmill or similar exercise device. A completely separate chamber is formed that encompasses a base portion of the exercise equipment including the running belt/rollers/deck of a treadmill or the seat and pedals of a stationary bicycle placed inside. These structures duplicate the framing of the combined system and therefore increase the cost, size, shipping bulk, part count, and overall complexity of the system. Further, such conventional DAP systems limit user adjustment of the corresponding exercise device including modifying incline or tilt settings, which impacts the pressure differential of conventional DAP systems.

Conventional DAP systems further lack convenience routines for effectively assisting users with initial setup and installation within the DAP system—especially for operating the system alone, as well as simple safety routines, such as quick disconnect options for immediately disconnecting lift mechanisms. In addition, conventional DAP systems focus on rehabilitation routines and treatments, and fail to provide expanded options for general consumer usage and custom interests, and in particular fail to meet therapy needs for child, adolescents and other low height users. In addition, conventional DAP systems are generally intimidating and rather unwelcoming for young users.

Thus, needs exist for overcoming various drawbacks and limitations of conventional DAP systems including improving system performance, functionality and user comfort and safety during use including effective for low height users, such as children and adolescents.

SUMMARY

This summary introduces certain aspects of the embodiments described herein to provide a basic understanding. This summary is not an extensive overview of the inventive subject matter, and it is not intended to identify key or critical elements or to delineate the scope of the inventive subject matter.

Example arrangements, aspects, concepts and features describe herein include a Differential Air Pressure (DAP) system having a support platform with an integrated treadmill. The DAP system may include a rigid shell that may include the integrated treadmill, an unweighting enclosure, and a restraint, which defines a tensioned orthotic frame adapted to bias a posture of a user to a standing position. The rigid shell either includes the support platform or is secured thereto and extends upward therefrom to an upper interface defining an upper opening. A base of the unweighting enclosure is secured to the upper interface and extends upward to a top opening, which connects a with a user seal worn by the user. The restraint is connected to either the support platform or the rigid shell connection therewith and is adapted to restrain a vertical height of a frame element connected to the unweighting enclosure and of the unweighting enclosure. The tensioned orthotic support frame is defined by the rigid shell and the unweighting enclosure that biases the user to a standing position.

In one arrangement of the, the DAP system may include a vertical support post secured to one of the rigid shell and the system platform, and a collar secured to the support post at a preset height for the exercise session based on a height of the user, in which a height of the frame element and a height of the unweighting enclosure are restrained by the collar in the inflated state for the exercise session. The support post may include a rear support post secured to the one the rigid shell and the support platform rearward of the top opening. The DAP system may further include a front anchor attached to a front region of the frame element substantially opposite the rear support post, in which the front anchor is adapted to offset an upward cantilevered force applied to the rear support post in the inflated state.

In another arrangement, the restraint may further include a pair of vertically adjustable supports secured to the rigid shell at opposite sides thereof extending upward through openings defined through the rigid shell to the vertically adjustable frame element. Each vertically adjustable support may be movably secured to the rigid shell at a preset height based on a height of the user. The connection between each vertically adjustable support and the frame element may restrain a vertical height of the frame element and the inflatable enclosure for the exercise session.

In some example arrangements, the rigid shell may have a hollow interior enabling space for rear kick movement and front kick ambulation of the user without interfering contact of the user with an interior of the rigid shell. The rigid shell may include a sound dampening lining an interior region of the rigid shell, and a control interface adjustably attached to the rigid shell, in which a height and an orientation of the control interface may be adjustable with respect to the user. In some example arrangements, the DAP system may further include a trunk support attached to the one of the system platform and the rigid shell, in which the trunk support may be adapted to at least partially and releasably extend about a portion of a trunk region of the user.

In some example arrangements, the rigid shell may include a base shell, and the unweighting enclosure may include an upper shell adapted for mating with the base shell in a substantially airtight connection with the base shell, in which the upper shell may be vertically translatable with respect to the base shell. The DAP system may further include a seal between the upper shell and the base shell, and a plurality of lift mechanisms each attached to one of the platform and the base shell at a first end and to the upper shell at an opposite second end. The DAP system may further include a lock controller accessible to the user. The upper shell may define a plurality of height adjustment slots, and the plurality of lift mechanisms may each include a selectively retractable and extensible pin at the second end, in which the lock controller is operatively connected to each of the lift mechanisms, and each pin is adapted to operate according to the lock controller. In some example arrangements, each of the plurality of lift mechanisms may include a selectively lockable lift mechanism, in which the lock controller is operatively connected to each lift mechanism, and each lift mechanism is adapted to selectively lock and unlock according to the lock controller.

In some example arrangements, the rigid shell may further include a plurality of observation windows, and at least one port adapted for allowing selective contact with the user during the session, in which the at least one port seal is adapted to substantially prevent a flow of pressurized air out of the rigid shell. In some example arrangements, the at least one port seal may include one of a duck bill type port seal, and an access sleeve attached to the at least one port adapted to provide external access to a portion of the user during the session while substantially preventing air leakage.

In some example arrangements, the rigid shell may further include a user tray attached to an external region of the rigid shell accessible by the user during the exercise session. In some example arrangements, the DAP system may further include regulated pressure source encapsulated by the rigid shell, and a microprocessor adapted to minimize noise from the regulated pressure source by regulating the speed of a fan of the regulated pressure source and adjusting a speed thereof to minimize fan sounds while maintaining a desired pressure in the chamber.

In some example arrangements, the DAP system may further include a step lengthening system for encouraging the user to increase a step length. The step lengthening system may include at least one of a position sensor for sensing a position of a lower limb body part including at least one of a knee, a shin, a foot, and a thigh. The position sensor may include one of a proximity sensor and a laser beam sensor operatively connected to the DAP system and adapted to detect a proximity of one of the body parts to a target location, wherein a proximity setting for a location and an orientation is adjustable to modify a target position, and a laser beam operatively connected to the DAP system. The laser beam may be adjustable for detecting one of the body parts has reached a target location and alerting one of the system or the user, in which the alerting is adapted to encourage the user to increase the step length. The at least one of the position sensor and the laser may be adjustable for modifying one of the target position and the target location for the session.

In some example arrangements, the DAP system may further include a clinician control interface adjustably attached to a portion of the DAP system inaccessible to the user and readily accessible to a clinician or other person proximate the DAP system. The user accessible control interface may be adapted for selective deactivation by a clinician or system admin, such that the user is unable to control DAP system operations while system operations are controllable via the clinician control interface. In some example arrangements, the DAP system may further include a control computer adapted to control operations of the DAP system for an exercise system for a low-height user.

Other exercise-related support devices, related systems, and components, and/or methods according to embodiments will be or become apparent to one with skill in the art upon review of the following drawings and detailed description. It is intended that all such additional devices, related components, systems, and/or methods included within this description be within the scope of this disclosure.

BRIEF DESCRIPTION OF THE DRAWINGS

FIGS. 19A and 19B are top perspective view of a trunk support of the example DAP systems of FIGS. 5, 6, 8 and/or 14.

DETAILED DESCRIPTION

Figure 1:
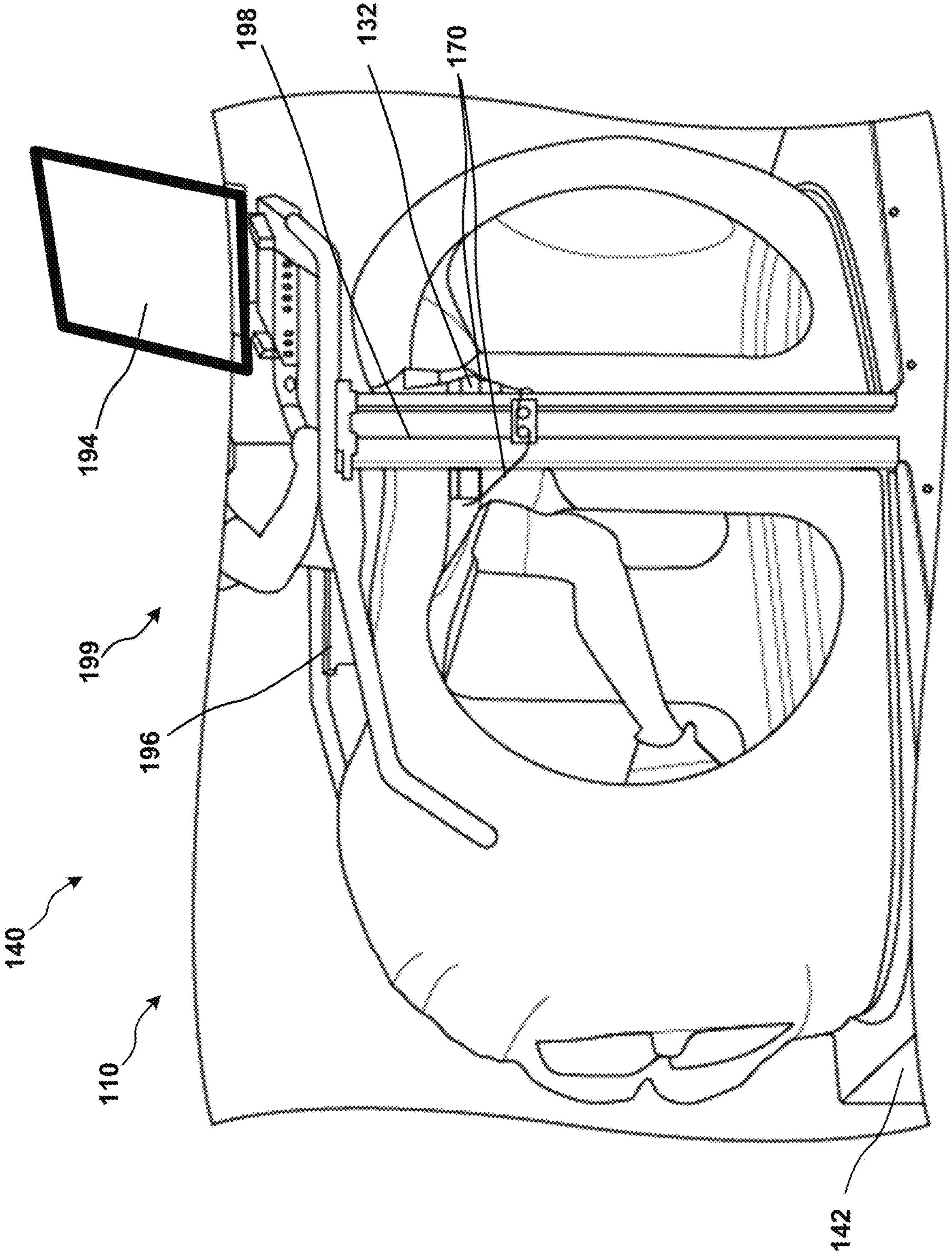
FIG. 1 is a right perspective view of an example schematic representation of a related prior art Differential Air Pressure (DAP) system that can also support a range of system operations and optional functions in accordance with aspects and features described herein.

For the purposes of promoting an understanding of the aspects, features, concepts and/or principles pertaining to example arrangements and uses of DAP systems shown or described herein, reference will now be made to the example arrangements illustrated in the drawings along with language describing the same. It will nevertheless be understood that no limitation of the scope of the invention are thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Unless indicated otherwise, the terms exercise arrangement, apparatus, device, equipment, systems, and variants thereof, may can be interchangeably used. In accordance with a general aspect of concepts discussed herein, an inflatable unweighting enclosure for an exercise device is provided along with methods for controlling or using the same for an exercise session in which the DAP system has a top port or opening formed therein and a corresponding frame element that may include a generally hoop-shaped seal frame that may include a frame element at least partially outlining the top opening. The frame element may be arranged to connect with a user seal or other user interface in an inflated state an unweighting exercise session, in which the user extends into and through the top opening and frame element.

In accordance with various aspects, features and concepts discussed herein, the inflatable enclosure may be configured to be self-supporting beyond its attachment at its base and/or in combination with the frame element. Such beneficial arrangements may allow operation of the DAP system at low pressures and/or applications of forces than for conventional DAP systems, and thereby may significantly reduce risks associated with usage, as well as provide enhanced freedoms of movement for the user and for exercise sessions for a young user or low-height user.

Example DAP System Having a Lift System and Selectively Actuated Hybrid Framework for Supporting Example Unweighting Operations & Methods Referring now to FIGS. 1 to 4, an example DAP also known as a differential air pressure System (DAP) 140 is generally shown having a platform 140, an inflatable enclosure 110 attached at its base thereto, a pair of vertical lifts 196, 198 integrally attached at base ends to the support platform 142, and a frame element 132 attached to the enclosure proximate a top port thereof in the inflated state. A lifting system 199 is formed via the pair of vertical lifts 196, 198 integrated with the platform 140 at their base ends and attached to opposite sides of the seal frame 132 via restraints. The lifting system can connect with the frame member 132 via opposing pairs of flexible, high tensile strength restraints 170 for performing lift operations and for selective connection with opposite sides of the seal frame 132 in a hybrid support arrangement for using the DAP System. DAP System 140 generally includes the same aspects and features DAP systems identified at the beginning of this specification and specifically incorporated herein by reference.

Figure 5:
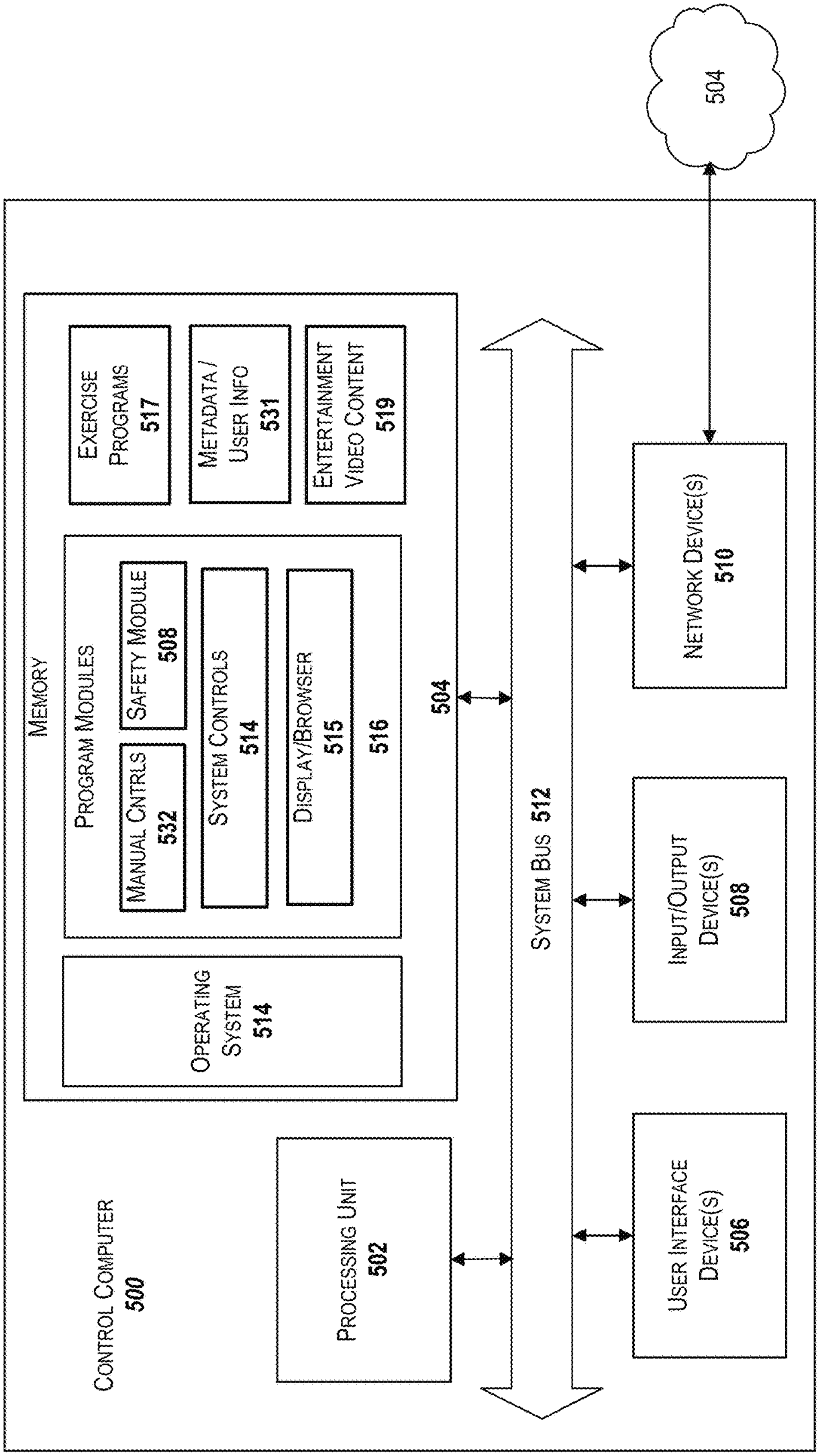
FIG. 5 is an example schematic representation of a prior art computer control system for the DAP system of FIG. 1 arranged for controlling system operations and performing related functions and optional routines according to aspects and features described herein.

As shown in FIG. 5 described further below, DAP System 140 includes a computer control system 500 that can be located in part in a portion of platform 142 or other convenient location, such as at a front portion of the platform. It is understood that portions of control system 500 can be distributed throughout the DAP System including components and portions located within monitor 194 and at other locations. Further, it is understood that components and portions of control system 500 can include sensors, limit switches, motor interfaces such as motors for driving the vertical lifts, and the like, which as discussed below can be arranged as a considered as a block diagram in FIG. 5 as computer system 500.

Traditionally, unweighting machines, harness systems and other unweighting devices have relied on used manual lifting systems for height adjustment. The applicant has invented a flexible and independent mechanized lift system 199 that may automatically or via control inputs raise and lower a frame element that at least partially goes around the user and shapes an opening of the inflatable enclosure. Examples of such a lift system are described in related applications listed at the beginning of this specification that are incorporated herein by reference.

The lift system 199 generally includes the left lift 196, the right lift 198, and an attachment mechanism for each lift to connect and disconnect with opposite sides of the frame element 132. The frame element 132 may move vertically as a whole and/or independently on each of the left and right sides based on connections with each of the left lift 196 and the right lift 198 via flexible restraints 170, as well as based on the low hoop stress curved edge portion extending along a seam and perimeter portions of the joined sheets as discussed herein and along with related patent applications.

Note that the left lift 196 and right lift 198 and related attachment components are designed for universal use on either the left or right side in mirror image arrangements of each other. As such, details shown and corresponding descriptions for each side may apply to both left and right-side components and features. The attachment mechanism 170 for each lift may connect and disconnect selectively with the frame element 132 to provide flexible options for use of the DAP System and use of the lifting mechanism 199 therewith, such as for lift operations alone and/or as a hybrid framework for supporting inflation modes of the DAP System.

The computer system 500 may be programmed or controlled for initial lift operations to raise the uninflated enclosure 110 from a base level via connections with restraints 170 to adjust the height of the lifting carriage to approximately 55% of the user's height, or in some cases between 50% and 60%, or in other cases 45% to 65%. To facilitate entry and exit, the lift may initially be moved higher, to approximately between 50-70% of the user's height, and then moved back down the target height of the ranges previously mentioned. This may facilitate entry and connection to the machine to have the seal frame initially higher during a connection process, but then lower in the proper position to facilitate running and movement and keep the bag out of the way of the arm swing of the user. Further, restraints 170 may selectively be removed after initial lift and set up operations and prior to full inflation for use of the DAP System 140 in an independent support mode without having height adjustment features provided via lifts 196, 198 or support from the hybrid framework that may be provided via connections with the vertical lifts during use.

The lift columns may each incorporate one or more limit switches 177 which signal to the processor that the lift column must turn off or be reversed. In one example arrangement, a first switch 177 (FIG. 3) may be a software switch that signals to the processor controlling the lift system it needs to stop the movement of the carriage and record a zero set point or an upper bound limit. There may be one software limit switch at the top and one at the bottom or both, or there may only be one at the top OR one software limit switch at the bottom since generally the length and number of rotations is known, thus once zeroed, a feedback mechanism such as a rotary encoder may determine the software limit on the side that does not have a software limit switch.

Based on research, development and testing, advantageous combinations have been identified for balancing desired motor requirements along with lift parameters such as lead screen diameter, lead screw pitch, lift speed, and providing the same as part of a lift system 199 that is non-backdrivable. The lift system 199 having non-backdrivable features that may permit operational use of the lift system as a hybrid framework for DAP System operations at high system loads from inflation pressure impacts that cannot readily be retained by the lift column motors and/or without requiring usage of high capacity motors and related lift framework components. A first limit switch 177 may be located near a bottom portion of each lift 3296, 3298 that may be used to Zero the reading of the incremental encoder (not shown), which may be a software limit switch. Once the first limit switch 177 has been zeroed, the machine may calculate its lift column carriage height from the zero-point.

The drive screw 182 may include use of a trapezoidal lead screw, which have flank angles and are arranged such that sliding friction prevents the nut or lead screw from moving without outside forces being applied or, in other words, is non-backdrivable. A non-backdrivable arrangement for the lead screw or drive screw 182 and corresponding driven nut may improve operations of vertical lifts 196 and 198 such that the lift mechanisms and lift system 199 are unable to move when the enclosure 110 is fully pressurized for providing unweighting support during use of the DAP System 140. In some arrangements, a trapezoidal lead screw may be used for vertical lifts 196, 198 having a diameter about 22 mm and a pitch of about 5 mm, which may also permit use of high-strength bearings based on a corresponding large diameter of such a lead screw arrangement. The trapezoidal lead screw 182 may be formed from steel and the corresponding carrier or driven nut may be attached to a carriage (not shown) that may be formed from gunmetal or red brass, which is a type of bronze or alloy of copper. However, tin and zinc that may provide benefits for usage with heavy loads and low speeds as generally encountered during operation of the vertical lifts 196, 198.

Figure 3:
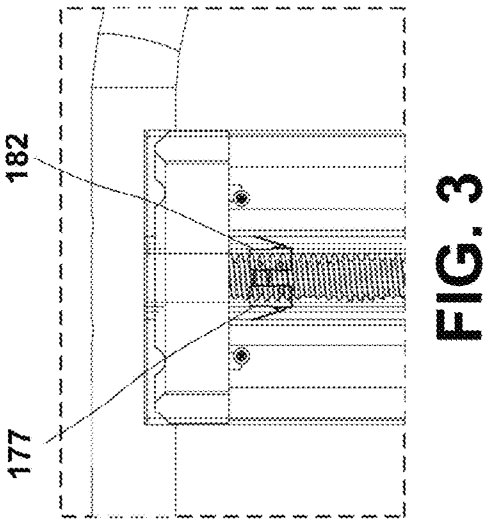
FIG. 3 is a close view of a portion of the prior art DAP System of FIG. 1 as indicated thereon.
Figure 4:
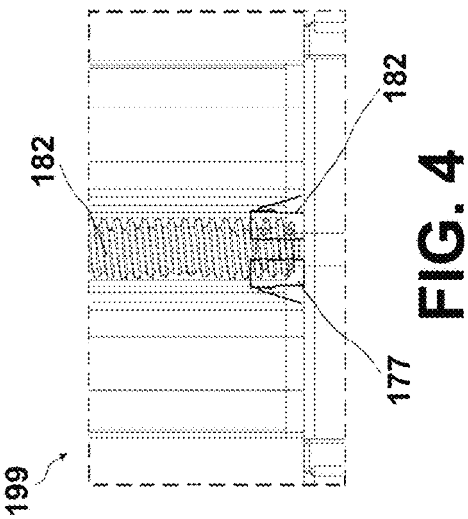
FIG. 4 PRIOR ART
FIG. 4 is a close view of a portion of the prior art DAP System of FIG. 1 as indicated thereon.
Figure 2:
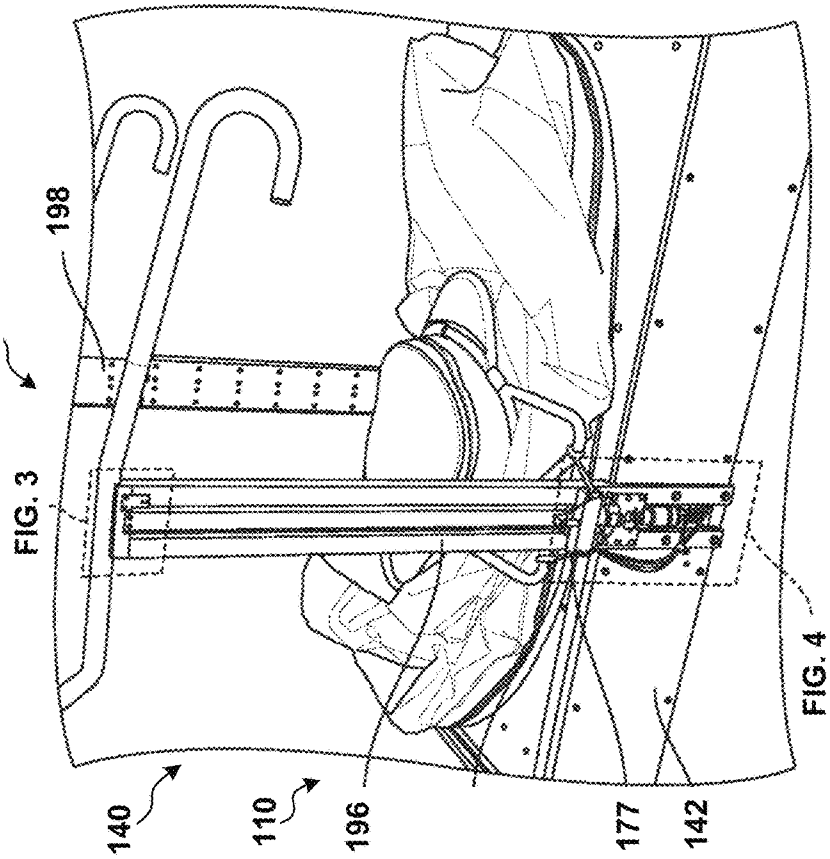
FIG. 2 is a left perspective view of the prior art DAP system of FIG. 1 shown in an uninflated state.

Notably, the arrangement shown in FIGS. 2, 3 and 4 for lift system 199 may enable a full range of height adjustments within a range of motion of the lead screw 182. For instance, as best seen in FIG. 4 along with FIG. 2, a drive motor for each lift 196 and 198 may be embedded within the support platform 140 below an upper surface of the platform such that the trapezoidal nut and the lowest switch 177 and lowest height position may be substantially the same as or slightly above an upper surface of the support platform 140. As an example, a height setting for the lowest switch 177 may be as low as about twelve (12) inches and preferably substantially the same as a low safety limit, such as about eighteen (18) inches. As discussed along with the example DAP system 640 described along with FIGS. 6 and 7, such an example DAP system may be used effectively for exercise sessions of a child or other low height user.

Example Computer Control System

Referring now to FIG. 5, a block diagram is shown illustrating a computer system 500 configured generally to provide the functionality described herein, as examples, for: Controlling operations of a DAP System including initialization of the corresponding inflatable enclosure for a user, monitoring and controlling operations of the exercise device and inflatable enclosure along with other system components; Interacting with the user; and Performing shutdown operations in accordance with aspects and features of subject matter discussed herein. In some arrangements, the architecture shown in FIG. 5 can correspond to the devices illustrated and described herein with respect to the DAP System control panel or control device, though this is not necessarily the case. The computer system 500 includes a processing unit 502, a memory 504, one or more user interface devices 506, one or more input/output ("I/O") devices 508, and one or more optional network devices 510, each of which is operatively connected to a system bus 512. The bus 512 enables bi-directional communication between the processing unit 502, the memory 504, the user interface devices 506, the I/O devices 508, and the network devices 510.

It is understood that the block diagram is illustrative of various example options for implementation of computer control system 500. For instance, in one implementation, a RASPBERRY PI Microcontroller running on the ANDROID operating system can be located in the console area. A main control hub thereof can be arranged for controlling the lift monitors and communicating general DAP System controls including a blower controller for blower monitoring and controls between the RASPBERRY PI and a blower controller and treadmill controller, which can cooperate with a treadmill exercise system for controlling subsystem management (maintaining target speed, etc.). These various circuit boards or modules can be separate or combined and be located in various parts of the DAP system such as in the console area, or one or more bottom enclosures.

The processing unit 502 can be a standard central processor that performs arithmetic and logical operations, a more specific purpose programmable logic controller ("PLC"), a programmable gate array, or other type of processor known to those skilled in the art and suitable for controlling the operation of the DAP system functionality. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, FPGAs, microcontrollers, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some arrangements, the memory 504 is operatively connected to a memory controller (not shown) that enables communication with the processing unit 502 via the system bus 512. The memory 504 includes an operating system 514 and one or more program modules 516, which can include system controls 514 for controlling operations of the DAP System, a safety module for detecting safety concerns and taking appropriate actions, and manual controls 532 for enabling sets of user commands in accordance with safety parameters and system status. The operating system 514 can include, but is not limited to, Android or iOS, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 can include various software and/or program modules for enabling or performing actions described herein, such as initialization actions for initial setup prior to and through inflation of the inflatable enclosure. In some arrangements, for example, the program modules 516 can operate a Safety Module 508 for performing Lift and Safety Restraint controls. These and/or other programs can be embodied in computer-readable media containing instructions that, when executed by the processing unit 502, perform one or more of the methods related to subject matter describe herein and related applications. The program modules 516 can be embodied in hardware, software, firmware, or any combination thereof. Although not shown in FIG. 5, it should be understood that the memory 504 also can be configured to store user settings and preferences data, historical usage data including previous usage settings, user interface data, metadata 531, exercise programs for usage of the exercise device, entertainment and/or video content 517, and/or other data, if desired.

By way of example, and not limitation, computer-readable media can include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 can include one or more devices with which a user accesses the computer system 500. The user interface devices 506 can include, but are not limited to, computers, servers, personal digital assistants, cellular phones, or any suitable computing devices, as well as through touch screen and/or dedicated interface devices associated with monitor 194. The I/O devices 408 enable a user to interface with the program modules 516. In one arrangement, the I/O devices 508 are operatively connected to an I/O controller (not shown) that enables communication with the processing unit 502 via the system bus 512. The I/O devices 508 can include one or more input devices, such as, but not limited to, a keyboard, a mouse, an electronic stylus, and/or touchscreen functionality, external buttons, rotary encoder knobs, heart rate monitors etc. Further, the I/O devices 508 can include one or more output devices, such as, but not limited to, a display screen including monitor 194.

The network devices 510 enable the computer system 500 to communicate with other networks or remote systems via a network, such as wireless network. Examples of the network devices 510 include, but are not limited to, a modem, a radio frequency ("RF") or infrared ("IR") transceiver, a telephonic interface, a bridge, a router, or a network card. The network 504 can include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network can be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Control computer system 500 can be coupled with various system devices, optional devices and sensors, supplemental devices and the like to provide a wide range of benefits and perform innovative methods as discussed in greater detail below. Such actions can be conducted as part of core operations for DAP System 140, as well as part of customized and optional actions and operations.

Orthotic Support Frame and Unweighting for an Example Disguised DAP System

Figure 6:
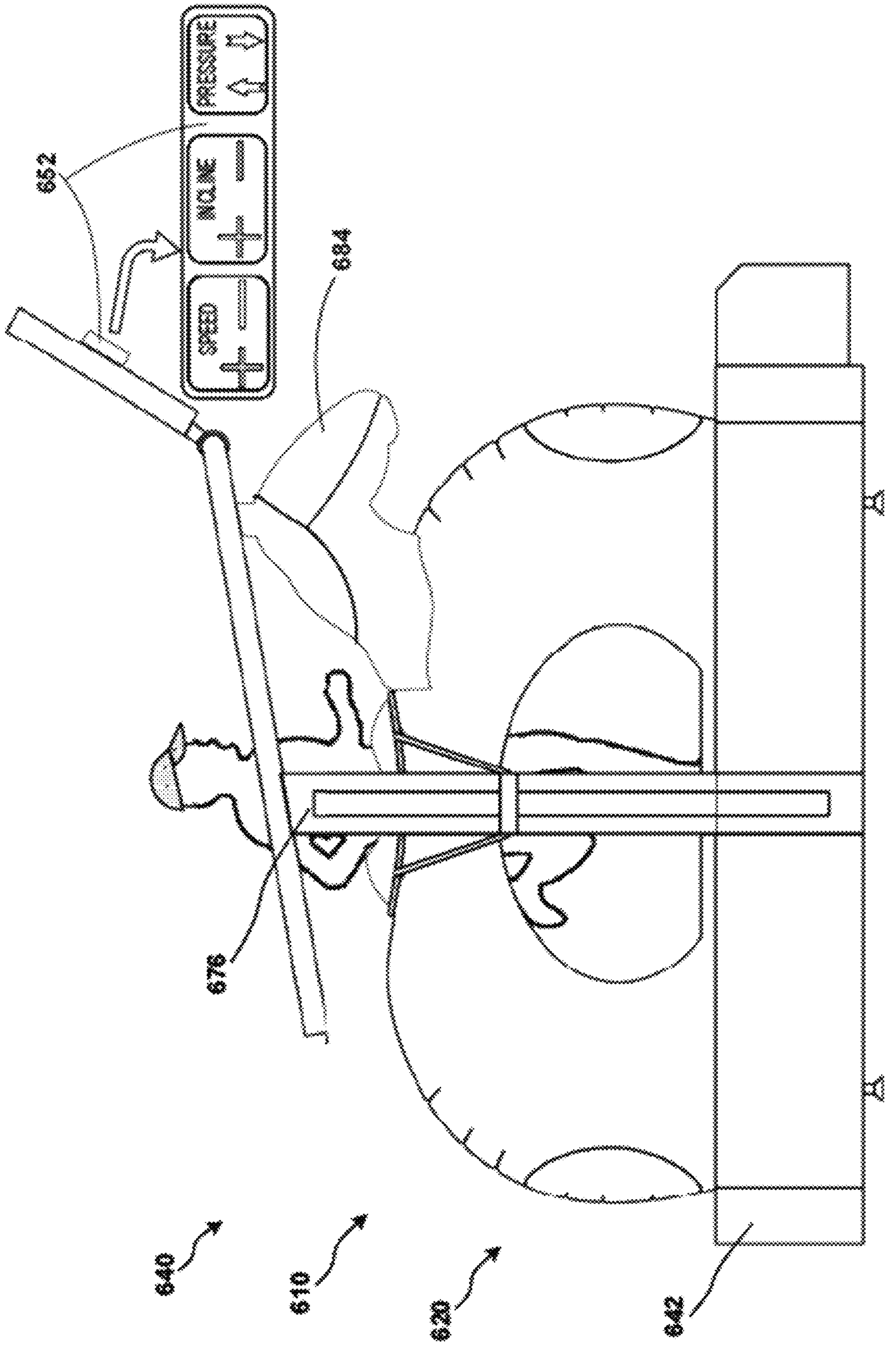
FIG. 6 is a right side view of an example DAP system according to aspects, features and concepts described herein.
Figure 7:
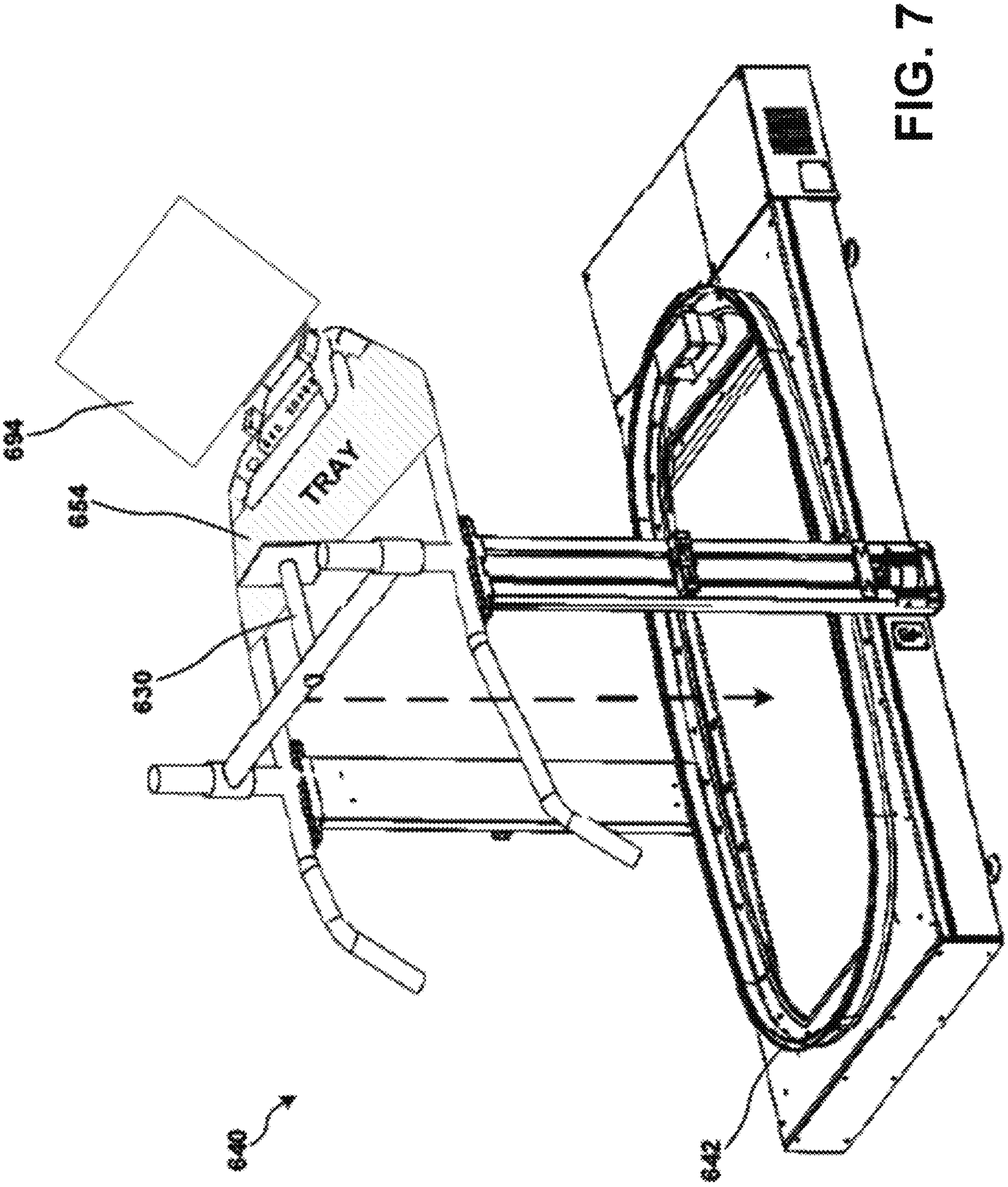
FIG. 7 is a right perspective view of an example DAP according to aspects, features and concepts described herein, which is shown without an inflatable enclosure.
Figure 8:
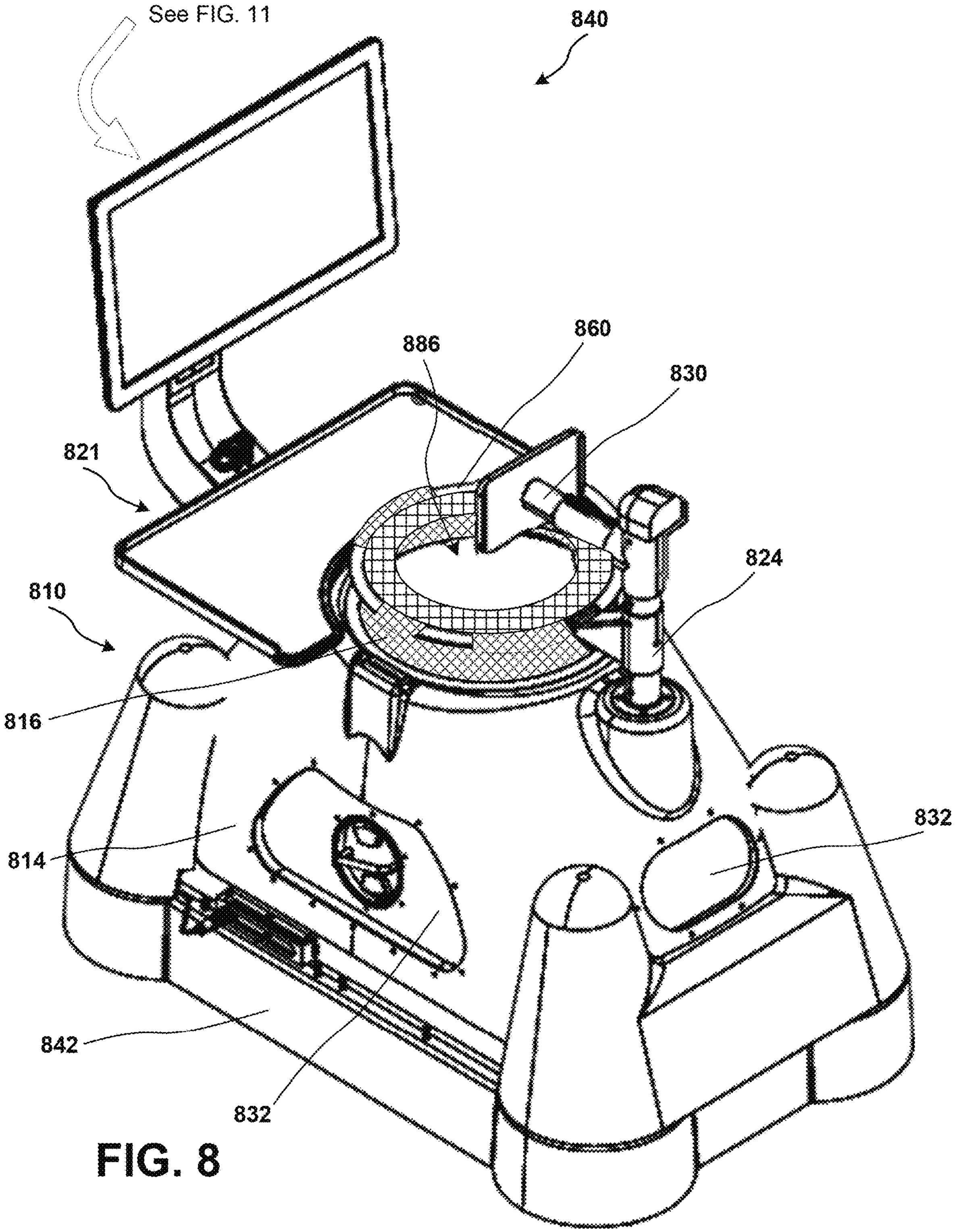
FIG. 8 is a left, rear perspective view of an example DAP system according to aspects, features and concepts described herein.
Figure 9:
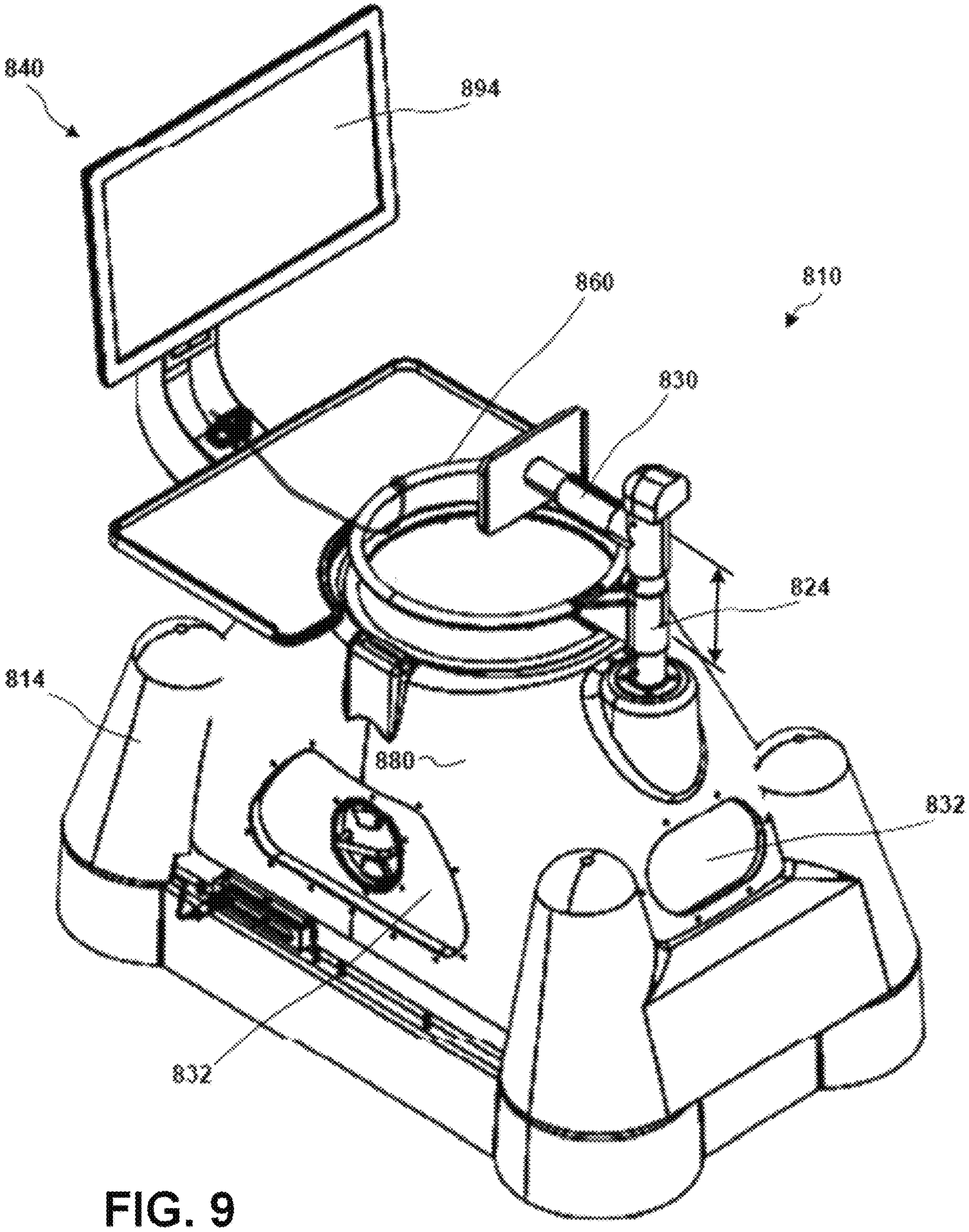
FIG. 9 is a left, rear perspective view of the example DAP system of claim 8 shown without the inflatable enclosure and the DAP system depicted partially transparent.

Referring now to FIGS. 6 and 7, an example DAP system 640 that may be used with a young user or other low height user is shown that is similar to DAP system 140 described above and to related DAP systems described in related patent applications noted above and incorporated herein by reference, which includes the same aspects, features and components except as described hereafter. As such, like numbers relate to like features.

DAP system 640 also includes a support platform 642 at its base that can contain a treadmill exercise device or other exercise device integrated therein and an inflatable unweighting enclosure 610 secured to the support platform, which may extend upward from the support platform 642 when pressurized in an inflated state. A pair of vertical lifts 676 may also be attached at opposite sides to the support platform 642 having vertical adjustable carriages for connecting to and restraining a height of the unweighting enclosure in the inflated state. Other example unweighting systems may include fixed or manually adjustable height adjustment arrangements without having powered vertical lifts. However, similar unweighting principles apply.

In the inflated state, the inflatable enclosure 610 is under pressure and applies upward unweighting force on the user for the exercise session for partially unweighting the user and thereby reducing impact forces and loads on the user. As such, the inflatable enclosure 610 along with the support platform 642 forms a vertical 'tensioned frame' or orthotic support frame 620 about the user, which generally allows movement flexibility for the user that typically occurs during running movements and other ambulation, and may further encourage the user to maintain an upright, standing posture for the session.

In addition, as shown in FIG. 6, the inflatable enclosure 610 includes a shape feature 684 depicting the inflatable enclosure as a horse ride, for example, or another child-friendly disguise shape. Conventional DAP systems are often large, noisy systems that are often intimidating for young users. The shape feature 684 along with other aspects and features of DAP systems described herein encourage young users to consider the DAP system like an amusement ride or play system and generally minimize potential concerns with using the system, if not disguise the system as a child-friendly structure. The support platform 642 may provide a substantially sealed airtight container for the blower and integrated treadmill (not shown) contained therein, which may reduce noise generated by blower operations. Further, the support platform may have an interior lining, such as a sound dampening material, for reducing noise that may intimidate the user. The DAP system 640 may also include an input control 652 spaced apart from the user or otherwise inaccessible to the user during an exercise session. Input controls accessible to the user, such as controls proximate or depicted on the face of display 694 may selectively be deactivated during the user session to allow a clinician to control operations of the DAP system without potential interfering control inputs or instructions from the user.

Further, as shown in FIG. 7, the DAP system may further include a user tray 654 and an adjustable trunk support 630. The user tray 654 allows for toys or other comfort-type items to be accessible to the user for an exercise session. DAP system 640 may further include an adjustable trunk support 1330 attached, for example, to handlebars mounted on the pair of lifts. The adjustable trunk support 1330 may be adapted to support the back of the user and, along with the inflatable enclosure, bias or encourage the user to remain in the target upright posture during exercise movements for the session. The trunk support 1330 may be arranged as a pillowed support with an attachment strap. The trunk support may act as a head or neck support if the attachment strap is not used and can serve as a postural target in this case as well under instruction from the therapist to maintain contact with the support, encouraging the user maintain a standing, upright posture.

Example DAP System with a Base Rigid Shell

Referring now to FIGS. 9 to 13, a DAP system 840 is shown similar to DAP system 640 described above and other DAP systems described in related applications noted above and incorporated herein by reference except as described below. DAP system 840 includes the same aspects, features, preferences and/or concepts as DAP system 640 and DAP systems described in the related applications except as described below. As such, like numbers refer to like features.

DAP system 840 includes a support platform 842, a rigid shell 814 secured to the support platform and/or integrally formed and connected therewith and extending upward therefrom, an unweighting enclosure 816 attached at a base thereof to an upper region of the rigid shell 814 that defines a top opening 886 therethrough at an upper region adapted to form a substantially airtight connection with a user seal (not shown) worn about a waist region of a user for an exercise session, and a frame element 860 extending about the user proximate the waist region, which is connected to the inflatable enclosure restraint 816 in the inflated state for an exercise session. The rigid shell 814 and the inflatable enclosure 816 connected to the user when pressurized and exert upward force on the user for partially unweighting the user. Further, the rigid shell 814 and the inflatable enclosure 816 in the inflated state define a tensioned orthotic frame, which biases the user toward an upright, standing posture.

The rigid shell 814 may have a tapered side profile wider at the base where integrated with or securely connected to the support platform 842 that decreases moving upward to the connection with the unweighting enclosure 816. Further the rigid shell can have a profile that is generally dome shaped. Other shapes of the hard shell can mimic FIG. 1 and have a base region that is smaller in cross section than a section above the base before tapering back in to be narrower than the proximate a connection with the inflatable enclosure 816. Such arrangements and shape profiles can provide a spacious interior to the user for front knee raise motions and rear kick movements for avoiding interfering contact for the user. In the case of a narrower base, there can be advantages to reducing footprint for example of the overall device. The taper can be from the front and rear portions or can also be from the sides of the shell where in the case of FIG. 13 the base starts wider and tapers in toward the user and/or in the case of FIG. 1 the base starts narrower, expands wider as it moves up toward the user, and then tapers narrow again as it approaches the user's waist in somewhat of an "egg shape".

The rigid shell 814 and supporting structures including the frame element 820 extending, at least partially, about a waist region of the user herein provide safety, comfort and locations for example for patients to rest their arms or grab. The closer the rigid shell is to the user's body, the more secure and stable the user feels within the DAP system 840, which may be particularly significant for reducing or eliminating apprehension for a young user. Further, a distance the inflatable enclosure 816 extends upward is significantly reduced vs. the DAP system 640 described above or with similar DAP systems such that a potential unsupported distance for the user in case of a failure in the fabric of the inflatable enclosure 816 is minimized. Thus, it may be advantageous particularly for young users to bring the rigid shell 814 as close as possible to the user's body while not impeding movement of the user for at least the user's perception of security. Further, the platform 842 including the integrated treadmill securely connected with the rigid shell 814 provides a relatively large, substantially airtight enclosure, which may include noise dampening features, such as an interior noise reduction lining therein that may minimize loud fan related sounds and/or other operational noises, like treadmill operations being heard by the user.

Due to the mechanics of running, the waist may be relatively stationary as the leg is moving forward and backward for running or other ambulation movements like walking. As such, it may be desirable to bring the rigid shell 814 as close as reasonably possible to the user's body, such as based on a location of a user's knee lift proximate a front region. Generally, a maximum height of the shell for a front interior region of the base shell 814 may be designed based on the heights of anticipated users, which for one range of users, such as for example children between 2 and 7 years old, may be about 21 inches off the treadmill deck surface or otherwise between 18-24 inches. As the DAP system 840 should accommodate a range of user heights, a circumference of the top opening 886 should accommodate enough forward movement for the tallest size user moving at the fastest desired speed and their accompanying knee lift during movement. In one arrangement, a lowest point of the rigid shell interior may be about 21 inches off the running surface, and an opening defined through an upper portion of the rigid shell 814 may be about 14.5" in diameter for a circle-shaped opening or otherwise a diameter between 11" and 18" for providing support along with movement flexibility for children between the ages of 2 and 7 years old who intend to jog slowly. The opening through to upper region of the rigid shell and/or for the top opening 886 may be oblong or non-circular while providing a distance from the user in front as described in these examples.

Conventional DAP systems generally focus on larger footprints for accommodating a wide range of users including most adults., whereas DAP system 840 and other example DAP systems described herein generally includes comparatively small DAP systems tailored for to low-height users including children and adolescents, which not only differ from conventional DAP systems based on size, but further reduce or effectively eliminate obstacles typically encountered for child or adolescent users including user ingress and egress along with initial setup. Limiting a maximum height H1 of the rigid shell enables an external person, such as a parent or a therapist, to physically lift a low height user into the machine. In testing, it was determined that an optimal height of the running surface may be about 21 inches up to 28 inches. Such a "drop in" height allows for a wide range of users to be picked up and placed inside the device without complicating the structure with door structures, locking clamps, and/or gaskets. However, the arrangement of a rigid shell may enable foot holds or other assist structures to be formed in the rigid shell 814 to assist with the lifting process by supporting some of the user's body weight or enable the user to assist with entry similar to entry into a play structure.

Figure 11:
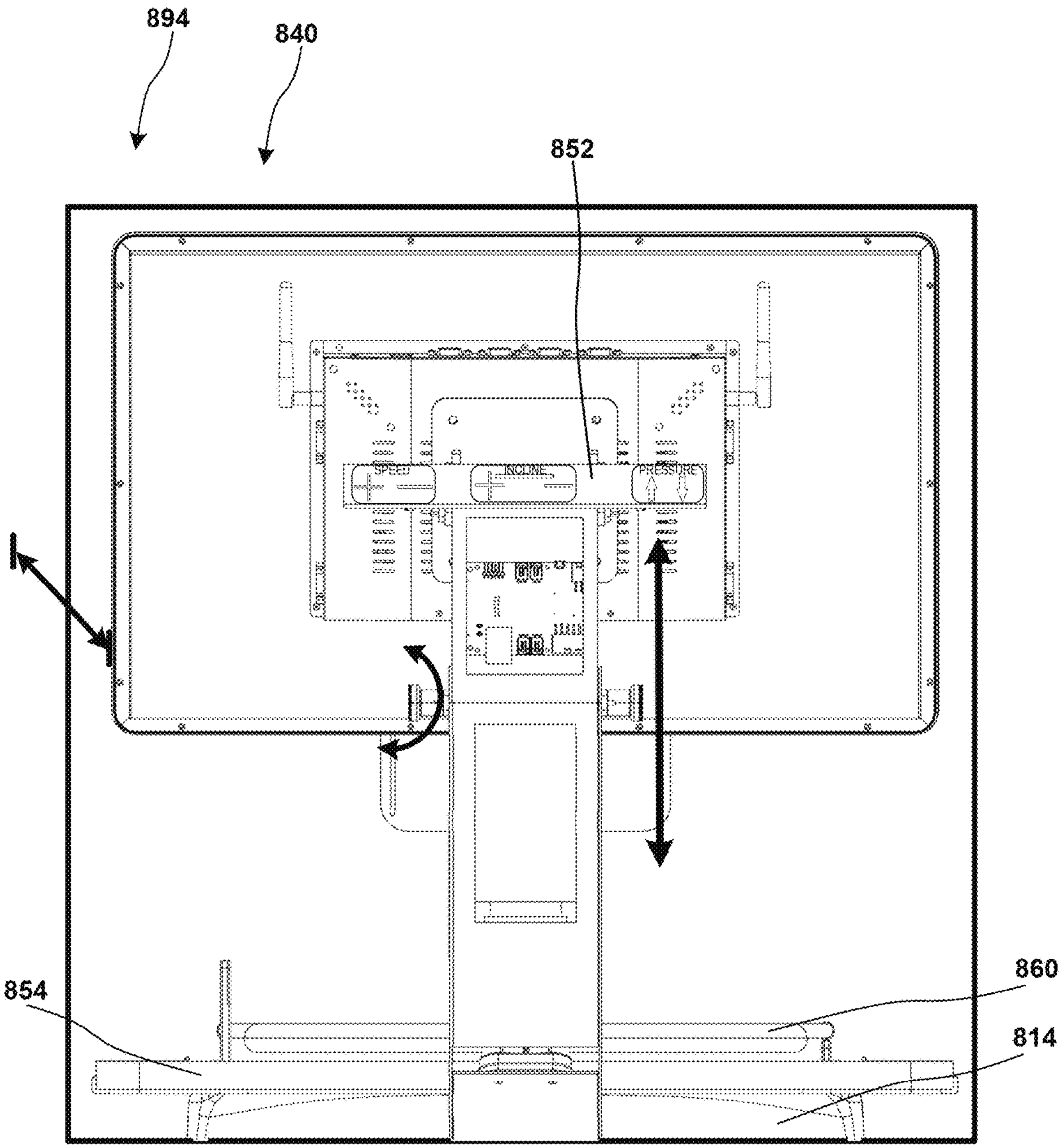
FIG. 11 is a close rear view of the monitor and control interface of FIG. 8 as indicated thereon.

A method of using a low height DAP system may include a therapist or clinician, a parent or other persons helping a child or other user, such as an adolescent put on a sealing garment, such as shorts, lifting the user into and through the top opening 886, in which the user may support themself by grabbing or holding on to the frame element 860 and/or sides of the rigid shell 814 that is reasonably close to the user's body. The clinician, parent or other assistant may zip in the user, and then operate the DAP system 840 for the child including controlling operations for an exercise or therapy session. As best seen in FIG. 11, and discussed further below, a clinician or displaced control input 852 may be located on a rear portion of the display 894 for enabling the clinician, parent or other adult to control operations of the DAP system 840 on behalf of the user. Preferably, control inputs located at or one a front face of the display 894 may be deactivated for the exercise session. Other displaced control inputs may include a tablet (not shown) or similar device having a wired or wireless connection with the DAP system 840 and the control computer thereof.

Figure 12:
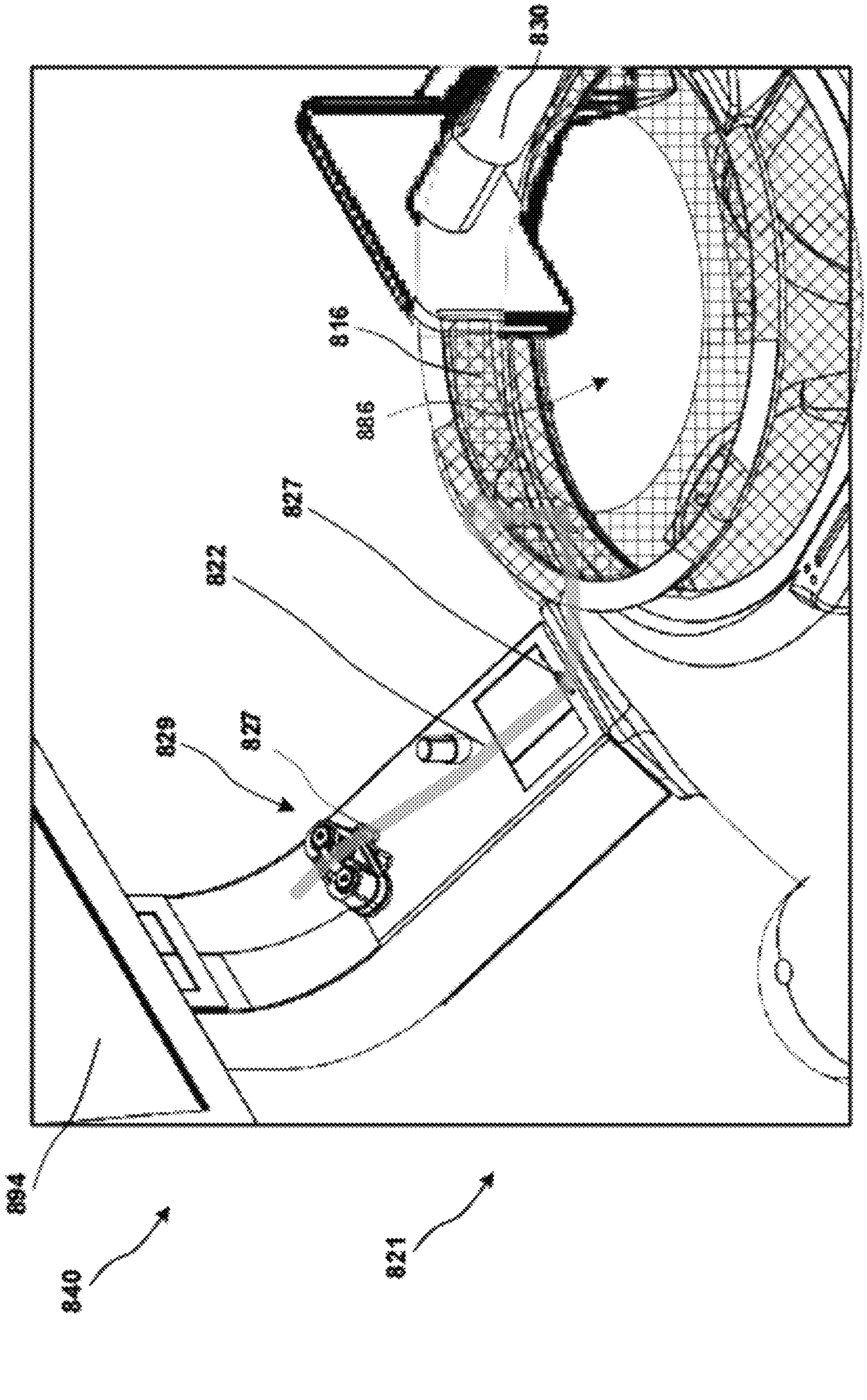
FIG. 12 is a close perspective view of the front anchor of FIG. 8.
Figure 17:
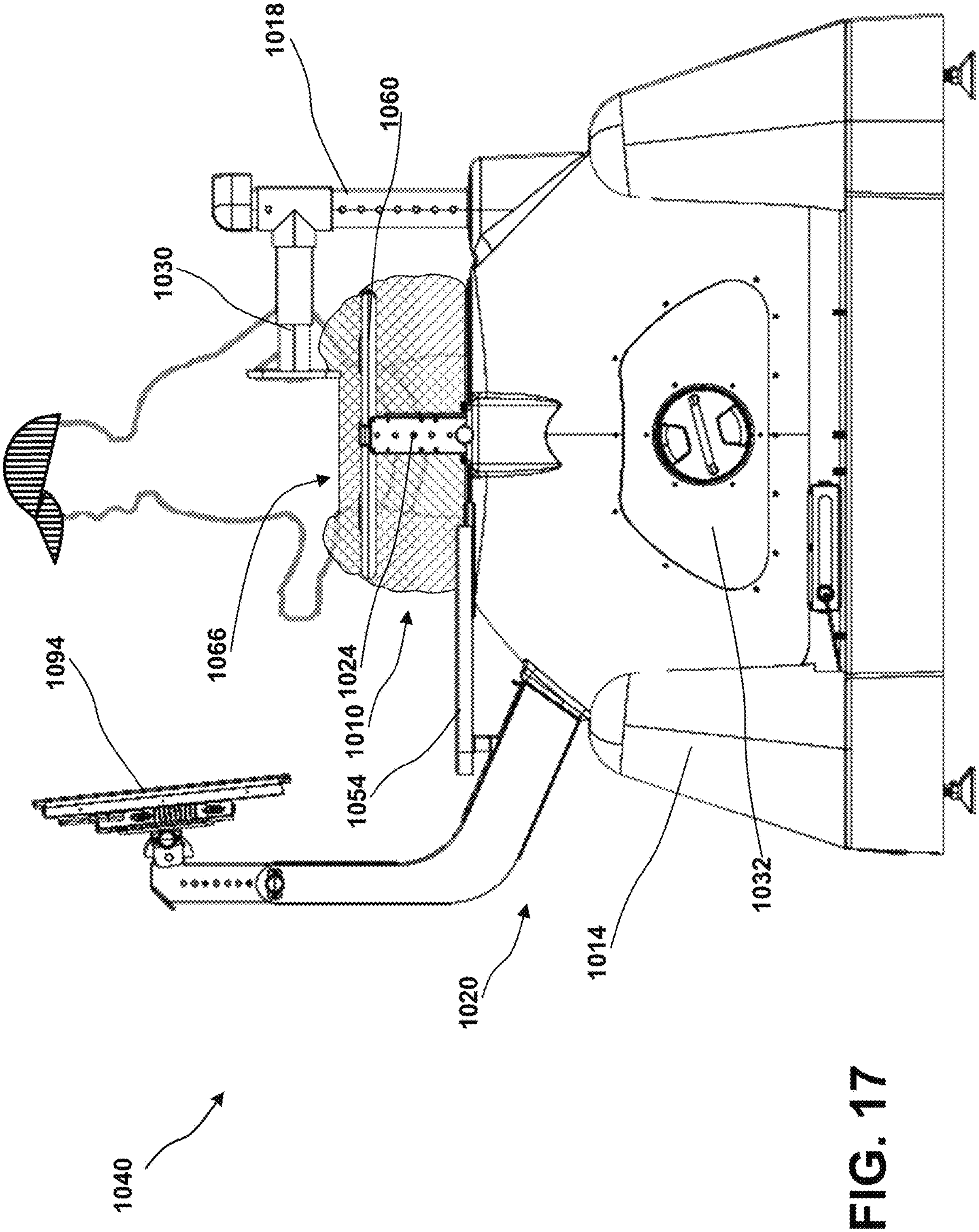
FIG. 17 is a left view of the DAP system of FIG. 14.

A circular opening may be defined through an upper region of the rigid shell at a connection surface thereof to which the inflatable enclosure 816 is securely attached via a substantially airtight connection (see e.g., FIG. 17). The inflatable enclosure 816, with the rigid shell 814 along with support platform 840 integrated or securely connected with the rigid shell, and the frame element 860 define a tensioned orthotic frame 821 in the inflated state that firmly supports about the user at a vertical height for the user and biases the user toward an upright, standing position (see e.g., FIG. 17). An adjustable trunk support 830 as discussed above may further cooperate with the tensioned orthotic frame 821 for supporting the user and biasing the user to an upright, standing posture. As can be seen in FIG. 12, the unweighting enclosure may defines a $2^{nd}$ cross-sectional area 825 that is less than, and may be substantially less than, a $1^{st}$ cross-sectional area 823 defined at a base region of the rigid shell 1210. Such an arrangement can enable lateral arm swing for the user without interference, and more significantly, promote a highly stable mounted connection for the unweighting enclosure on the upper region of the rigid shell 814. Such shaping further reduces the amount of fabric that must be compressed and contained during height adjustment which reduces fabric tension and restraining loads that are transferred to the rigid shell.

As noted above, a rigid shell support structure close to the body promotes a sense of safety and support to the user. Overall, a dome or upwardly tapered profile shape for the rigid shell 814 combined with an approximately circular shaped opening and mount point for the unweighting enclosure defined through the upper region of the rigid shell may minimize an interior volume of the DAP system 840, which may reduce inflation time and operations of a blower. For sessions with many low height users, such as children, excessive and prolonged blower noise can hinder user compliance and usage of the DAP system. DAP system 840 may also employ noise reduction measures to minimize impacts of blower noise on the user, such as an inner lining (not shown) of an interior of the rigid shell with noise dampening foam or the like.

Noise reduction can further occur from using a regulated blower fan speed in to provide as much pressure as required and reduce the need for a release valve which can cause substantial noise from air whooshing out of the orifice and increase cost. The fan speed can be controlled within a pressure control feedback loop wherein a pressure sensor communicates to a controller the difference of a real pressure value compared to a target and the fan speed is adjusted according to whether the actual pressure is below or above a target. This may be beneficial because in testing it was observed that youth prefer to have a white noise vs. a whooshing sound as one gets with an unrelated pressure source plus a valve regulating the output. A regulated blower fan speed further provide further benefits in that input power may be reduced to a minimum requirement because the fan is only working as hard as it needs to in order to provide the required amount of pressure. Further, the novelty of using a regulated fan speed with a hard shell is that the sound is created going INTO the pressurized chamber where it may be easily dampened and hidden within the volume of the rigid shell 814 vs. a valve regulating the outflow of air which creates sound OUTSIDE of the rigid shell and is more readily heard by the user and bystanders. Other measures may include enclosing the blower itself in a compartment which can include sound dampening foam, running the air through a baffles, or angling the inlet air straight or in the downward direction to direct sound away from the user and bystanders. Such direction of inbound air to the chamber may use angled pipes or outlets (not shown) attached at the inlet to the chamber.

Figure 10:
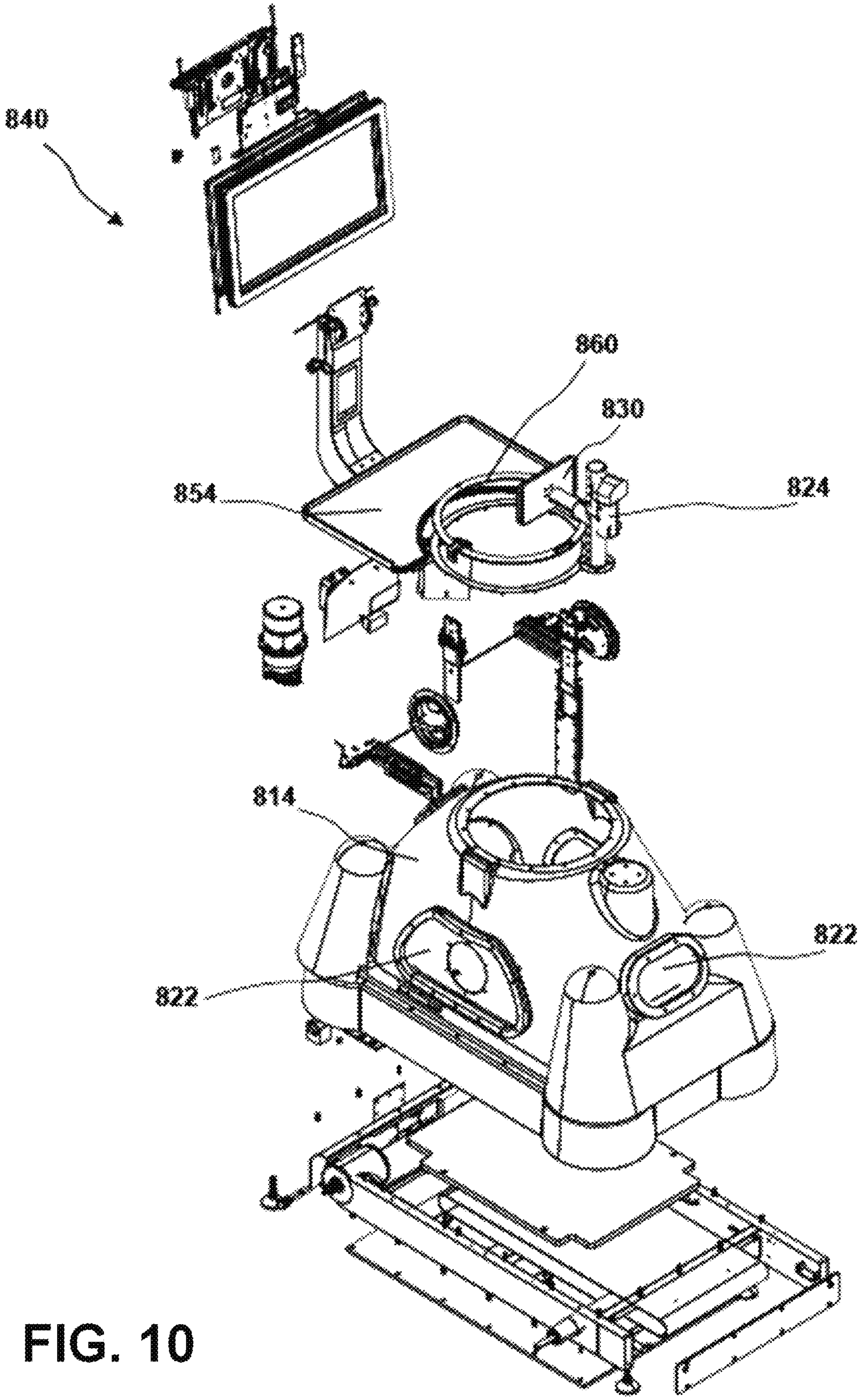
FIG. 10 is an exploded left, rear perspective view of major components of the DAP system of FIG. 8.

As can be seen in FIG. 10, rigid shell 814 may be formed as a single component or alternatively as an assembly of multiple shell components (not shown), such as from a rigid shell securely attached to or integrally formed with the support platform 842. For example, a single fiberglass moulded shell may form substantially the entire rigid shell 814 as shown. Generally, the term rigid can also be described as non-collapsible where under normal working conditions the shell cannot be collapsed due to a pressure differential between air inside and outside the shell. Shell components may further include injection moulded components, extruded parts, roto moulded, pressure formed parts, fiberglass moulded components, metal frameworks and the like assembled to form rigid shell 814 and/or support platform 840 as a rigid, substantially airtight assembled arranged to orient and support the user in a target upright posture for the session, as well as enable therapeutic observations and clinical engagement. As such, rigid shell 814 may have a tapered shape as noted above, which can be arranged for orienting and firmly supporting the user in a target upright standing posture through the opening defined through the upper region. Such an arrangement minimizes a vertical extent of the unweighting enclosure attached to the upper region in the inflated state and provides a firm base for its attachment.

As shown in FIG. 11, the DAP system 840 can include an orientation and height-adjustable control panel interface 894, which can be mounted to the rigid shell via an adjustable support that allows for custom height, fore/aft positioning and orientation settings by the user. Such a highly adjustable support arrangement can promote user interactions with and engagement for the session along with enabling user self-assessment of progress and performance. As such, the DAP system can include one or more cameras (not shown) that can allow the user to view performance without interfering with the target posture, such as by viewing their foot movements without looking down.

The control panel interface in such a flexible arrangement for the user can also allow for direct user interactions and performance reactions and guide postural position targets that include neck and head orientation while standing or exercising which can be a goal of the therapy session. For example a therapist can position the control panel interface higher in order to induce the patient to look upwards or straight ahead, thereby altering and potentially improving their postural while they are ambulating.

The monitor/control panel interface 894 can have an adjustable mount with the rigid shell, such as incorporating a sliding and locking support arm having adjustment pins and slots as depicted in FIG. 11, which can be on a back side of a vertical section of the console attachment arm. As can be seen in FIG. 11, slots can be observed be included that allow for the vertical movement of the console or monitor. As the console is locked, it can also be rotated around a pivot and locked in rotation with friction. A plate with multiple holes for locking a rotational adjustment and a pin to lock into such holes can be used similar to what may be observed on a television mount. Fore/aft adjustment can be incorporated into the support of FIG. 11 to provide adjustability for the monitor/control panel similar to the high level of adjustability described above for the trunk support. In such a manner, full adjustability can be given to the monitor so that it can adjust vertically up and down and also tilt relative to the user.

Figure 13:
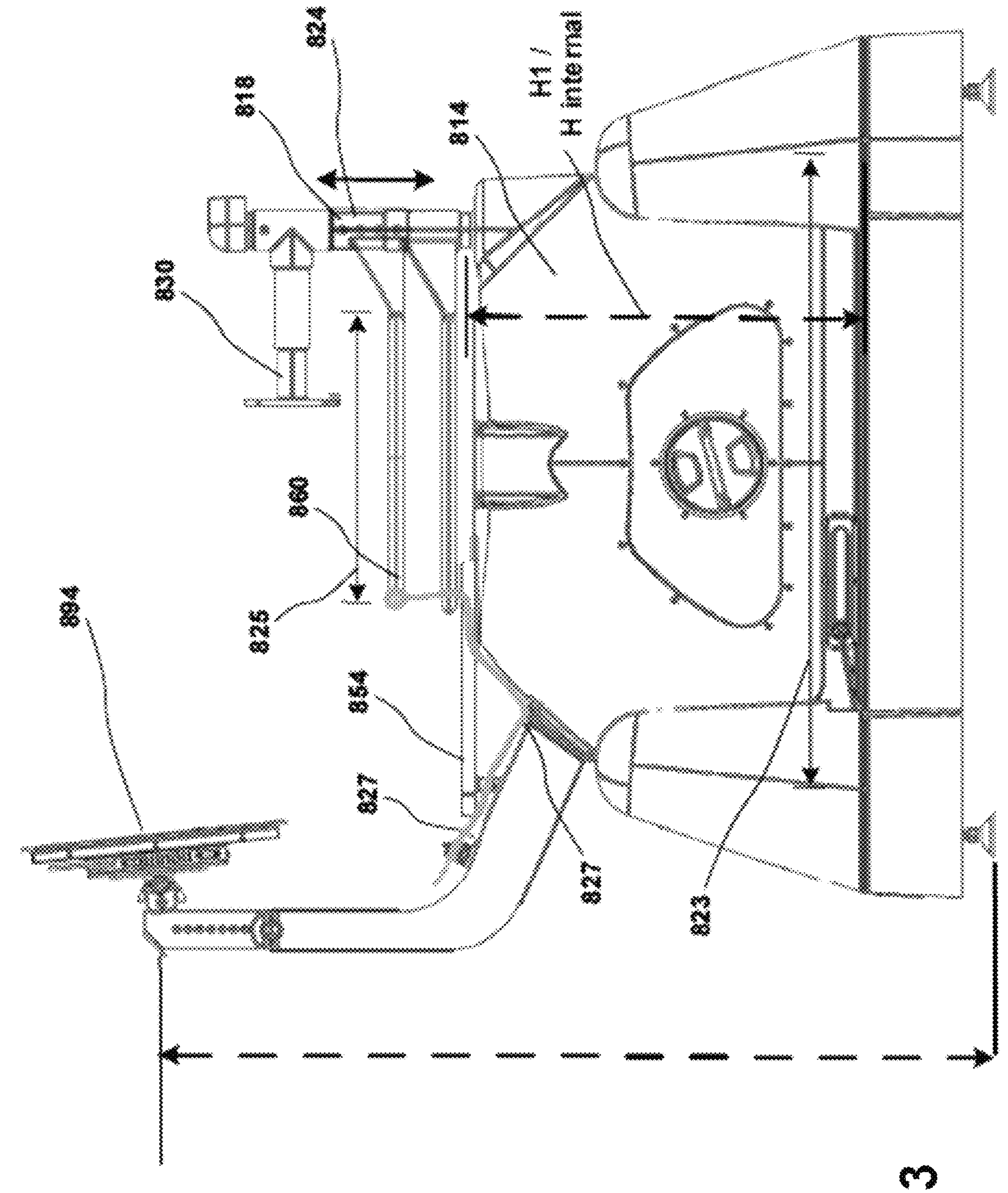
FIG. 13 is a left view of the example DAP system of FIG. 8.
Figure 14:
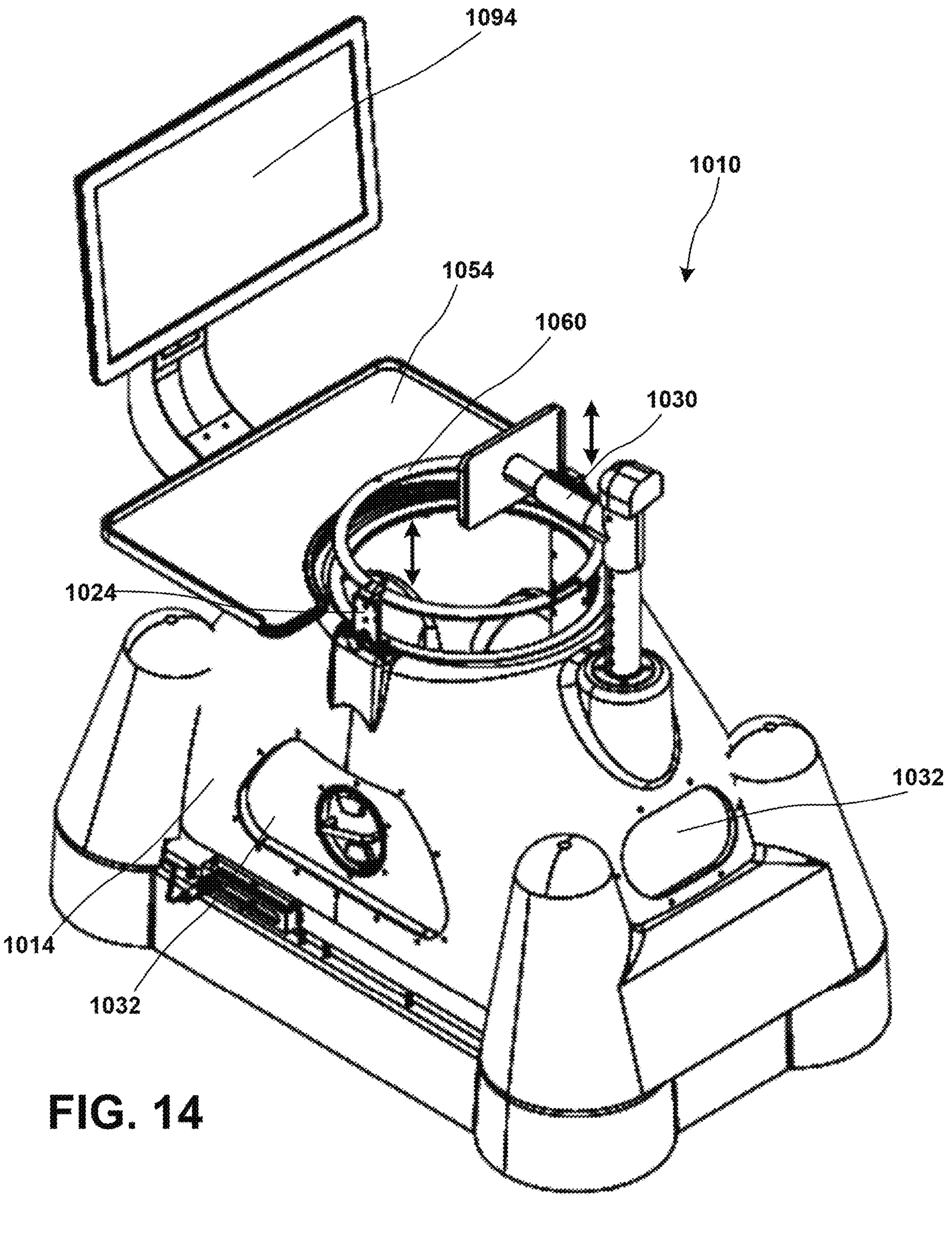
FIG. 14 is a left, rear perspective view of another example DAP system according to aspects, features and concepts described herein.
Figure 15:
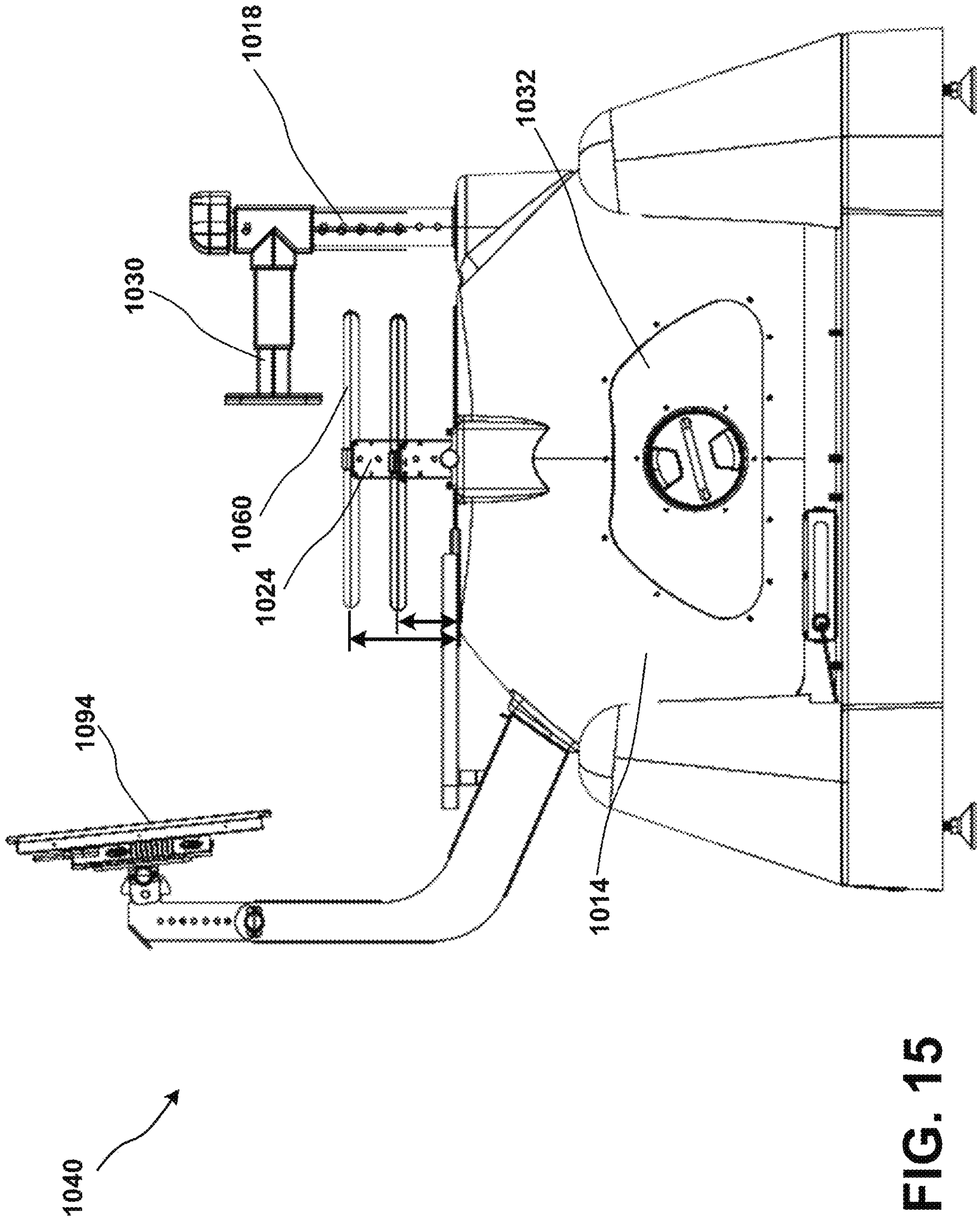
FIG. 15 is a left view of the DAP system of FIG. 14.
Figure 16:
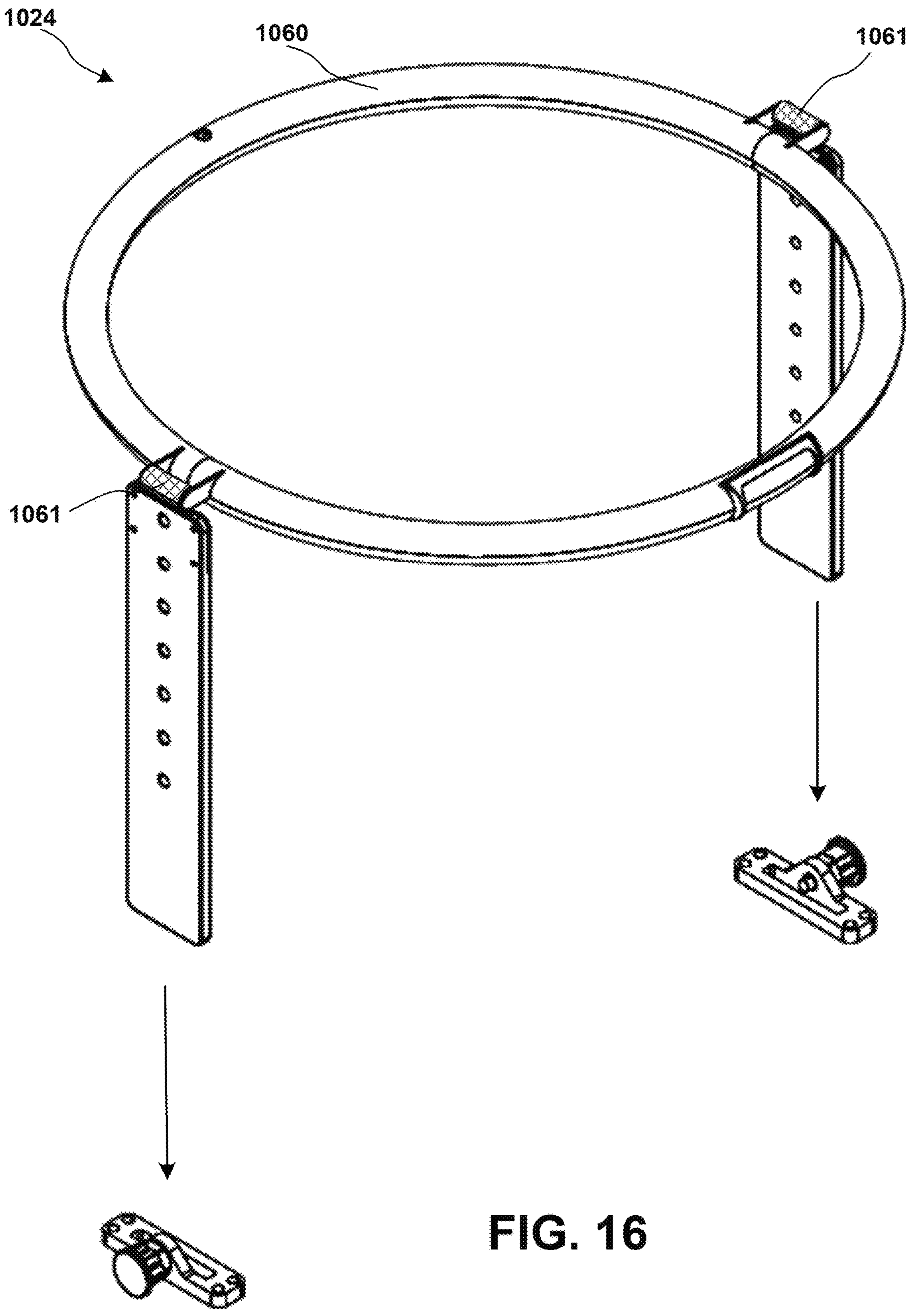
FIG. 16 is a left, rear perspective view of the frame element and height-adjustable restraints of the DAP system of FIG. 14.

As best seen in FIG. 13, a height for the frame element 860 is adjustable according to a height of the user, and may be restrained at a desired height for the user via a height adjustable collar 824 connected to a vertical post 818, which as shown may be located rearward of the user, in which the vertical post 818 may also provide support and adjustment options for the trunk support 830. Such an arrangement may result in rearward cantilevered forces being applied to the vertical post 818 as generated from inflation forces applied to the rigid shell 814 and particularly to the inflatable enclosure 816 in the inflated state.

Another Example Dap System with a Base Rigid Shell

Referring now to FIGS. 14 to 17, a DAP system 1040 is shown similar to DAP systems 640 and 840 described above and other DAP systems described in related applications noted above and incorporated herein by reference except as described below. DAP system 1040 includes the same aspects, features, preferences and/or concepts as DAP systems 640, 840 and DAP systems described in the related applications except as described below. As such, like numbers refer to like features.

DAP system 1040 primarily differs from DAP system 840 with respect to height-adjustment features and restraints applied to the frame element 1060. The frame element 1060 can be attached to the rigid frame at a connection surface of the rigid frame 1014 proximate the opening defined through the upper region of the rigid frame. The frame element 1060 can be arranged as a vertically-adjustable frame element partially or substantially extending about the top opening 1066 extending about the user in the inflated state. The seal frame can be adapted for connecting to the unweighting enclosure, such as via Velcro loops, zippered fabric loops that wrap around parts of the seal frame, ropes or flexible restraints attached to the unweighting enclosure for restraining a height of the unweighting enclosure for the session. The unweighting enclosure 1010, 1016 can be formed as a flexible enclosure adapted to extend vertically from the rigid shell while under pressure in the inflated state.

The frame element 1060 can be rigidly connected to one or more adjustable supports 1024, such as a pair of adjustable supports 1024 extending through upper portions of the rigid shell 1014, which may be locked as desired in a vertical position for restraining the frame element and thereby the inflatable enclosure connected thereto at a desired vertical height for the user. The support bars 1024 may be vertically adjustable and lockable for example with a pin and slot system shown in FIGS. 16 and 17.

Notably a combined benefit and effect of DAP system 1040 is to provide a tensioned orthotic frame and support arrangement for promoting neuroplasticity for the user based on the user performing ambulation exercises including walking or running leg movements—while in the target upright standing posture and in a safe exercise environment. Firm support can provided to the user for the same by the stable rigid shell arrangement firmly supporting the attached flexible inflatable enclosure 1016 that together with the rigid shell 1014 and restrained frame element 1060 forms the tensioned orthotic frame in the inflated state having a short vertical extent upward from its support attachment to the rigid shell. Such an arrangement enables movement flexibility for the user during the session while partially unweighting the user and biasing the user toward the target upright posture.

Trunk Support

Figure 18:
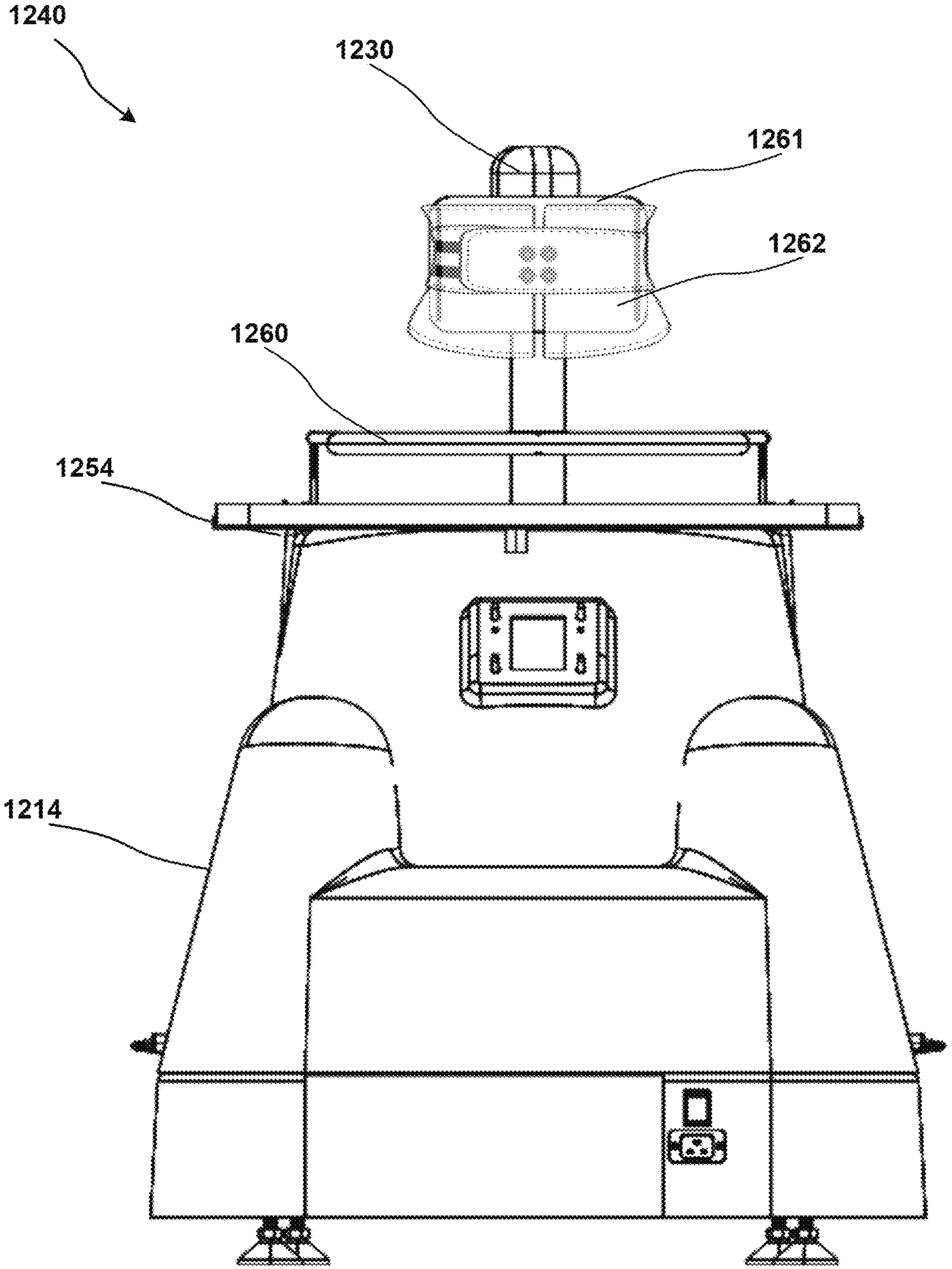
FIG. 18 is front view of the example DAP system of FIG. 14 shown without the inflatable enclosure, the monitor and control interface, and related support for the monitor and control interface.

Referring now Referring now to FIGS. 18, 19A and 19B, another DAP system 1240 is shown that generally includes the same aspect and features as DAP systems 640, 840, and 1040 except as discussed hereafter. DAP system 1240 may generally represent or be the same as DAP systems 640, 840 and 1040 that as shown and described above include an adjustable trunk support 1230 attached to the rigid shell 1214 and/or to the support platform 1042 via handlebars or other intervening support structure. The adjustable trunk support 1230 includes a rear back support 1230 adapted for supporting the back of the user and assisting the user to remain in a target upright posture during exercise movements for the session.

The trunk or back support 1230 may be arranged as a pillowed support with an attachment strap. The back support can act as a head rest and neck support if the attachment strap is not used and can serve as a postural target in this case as well under instruction from the therapist to maintain contact with the support, encouraging the user to straighten and maintain an upright, standing posture for the exercise session. The support 1230 may be height-adjustable and selectively removable according needs of the user. Alternatively, the trunk support may adapted to be swung out of the way of the user instead of full detachment. A height of the trunk support 1230 may be vertically adjusted in relation to the user's trunk and preferably be fore/aft adjustable as well according to needs of the user.

Access Ports

Figure 20A:
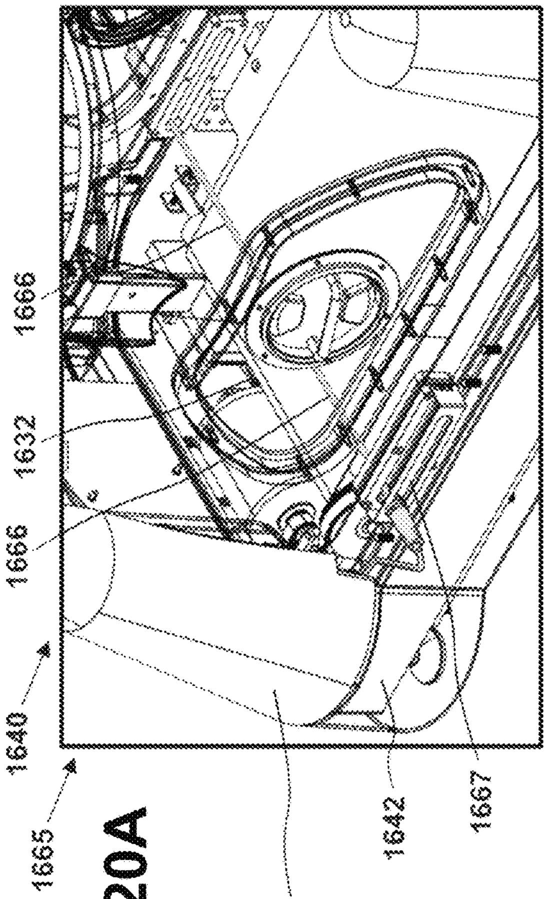
FIG. 20A is a rear perspective view of the example DAP systems of FIGS. 8 and/or 14 with the rigid shell, support platform and the integrated treadmill depicted partially transparent.
Figure 20B:
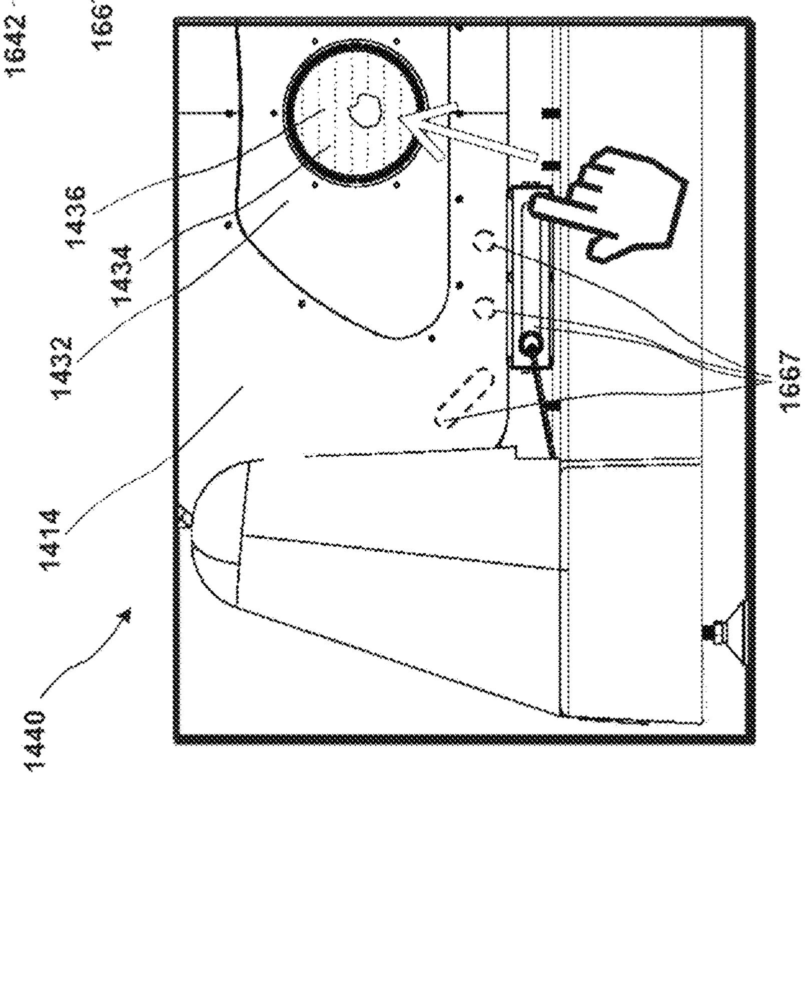
FIG. 20B is a left view of the support platform and integrated treadmill of the example DAP systems of FIGS. 8 and/or 14 showing a close view of an access port and access sleeve along with one of a pair of lasers for a step lengthening system according to aspects, features and concepts described herein.
Figure 21B:
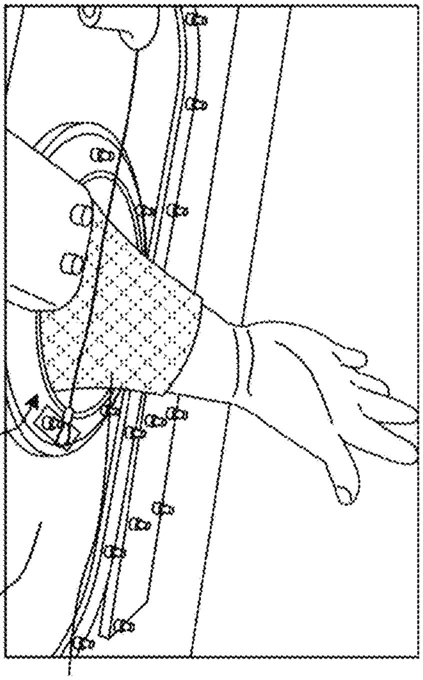
FIG. 21B is an inner perspective view of the lateral access port and access sleeve of FIG. 20B shown.

Referring now to FIGS. 20B and 21B, yet another example DAP system 1440 is shown that can include DAP systems 640, 840, 1040 and/or 1240 described herein or described in related patent applications incorporated herein by reference having observation windows similar to observation windows 1432 shown along with example DAP system 1440. As shown, observation windows 1432 and similar observation windows of similar DAP systems may include access ports 1434 permitting clinician access to portions of the user's lower extremities during the exercise session. The rigid shell components and/or flexible enclosure components may include a plurality of observation windows 1432 along with access ports 1434 defined therethrough, which can be adapted for enabling connections through airtight access ports, such as via a flexible sleeve 1436 secured thereto that may allow access from the outside the enclosure component or rigid shell into an interior of the enclosure such that a clinician or therapist may touch, move, or otherwise interact with a user's lower limb to encourage the user to step or move as desired.

As can be seen in FIG. 21B, ports can be substantially airtight and can seal around the clinician's or therapist's limb, for example, as a flexible fabric or neoprene cone as depicted in FIG. 21B. The flexible sleeve 1436 may be adapted to inverts upon insertion and form a seal to the therapist's arm and revert to a normal position as shown in FIG. 20B when the arm is pulled out, which may collapse under pressure to prevent an outflow of air. Other seal arrangements may also be used, such as twist lock or duck bill seal designs.

Distraction and Other Features

The front tray 656, 856, and 1056 shown and described above along with DAP systems 640, 840 and 1040, and/or optional front trays added to other DAP systems incorporated herein by reference along with option supports for a tablet device (not shown) may be used with DAP systems described herein young user exercise sessions. Such features may significantly enhance effectiveness of therapy sessions by distracting the user during the session. The front tray 656, 856 or 1056 may contain favorite toys or comfort items for the user, while a tablet (not shown) retained by a tablet support may allow the young user to play a familiar game. Such distractions can be beneficial for instances, such as when clinician contact with a user's lower extremity is needed, such as for assisting with ambulation movements of a foot via an access port.

A treadmill, exercise device or platform may be integrated within the support platform as described above or may be retained therein, and may function purely as a standing aid to help those who are unable to stand on their own and not yet able to walk. In this way a user may learn to stand and gain strength supporting their own weight and then graduate to learning to take a first step, which has in fact been observed by the applicants.

Lasers and Step-Lengthening System

Figure 21A:
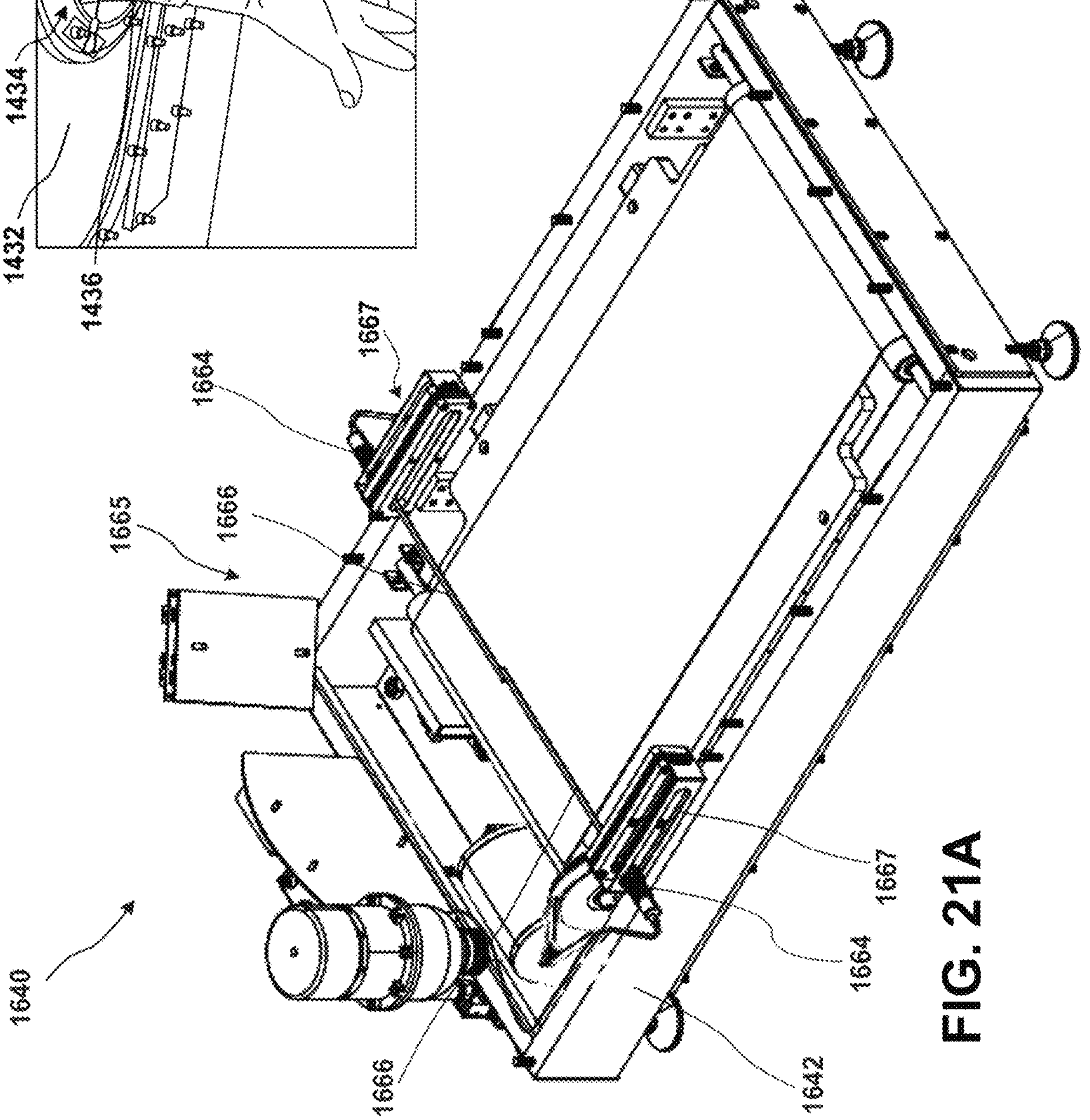
FIG. 21A is a left rear perspective of the support platform and integrated treadmill of the example DAP systems of FIGS. 5, 6, 8 and/or 14 showing a close view of light beams from a pair of lasers for a step lengthening system according to aspects, features and concepts described herein.
Figure 22:
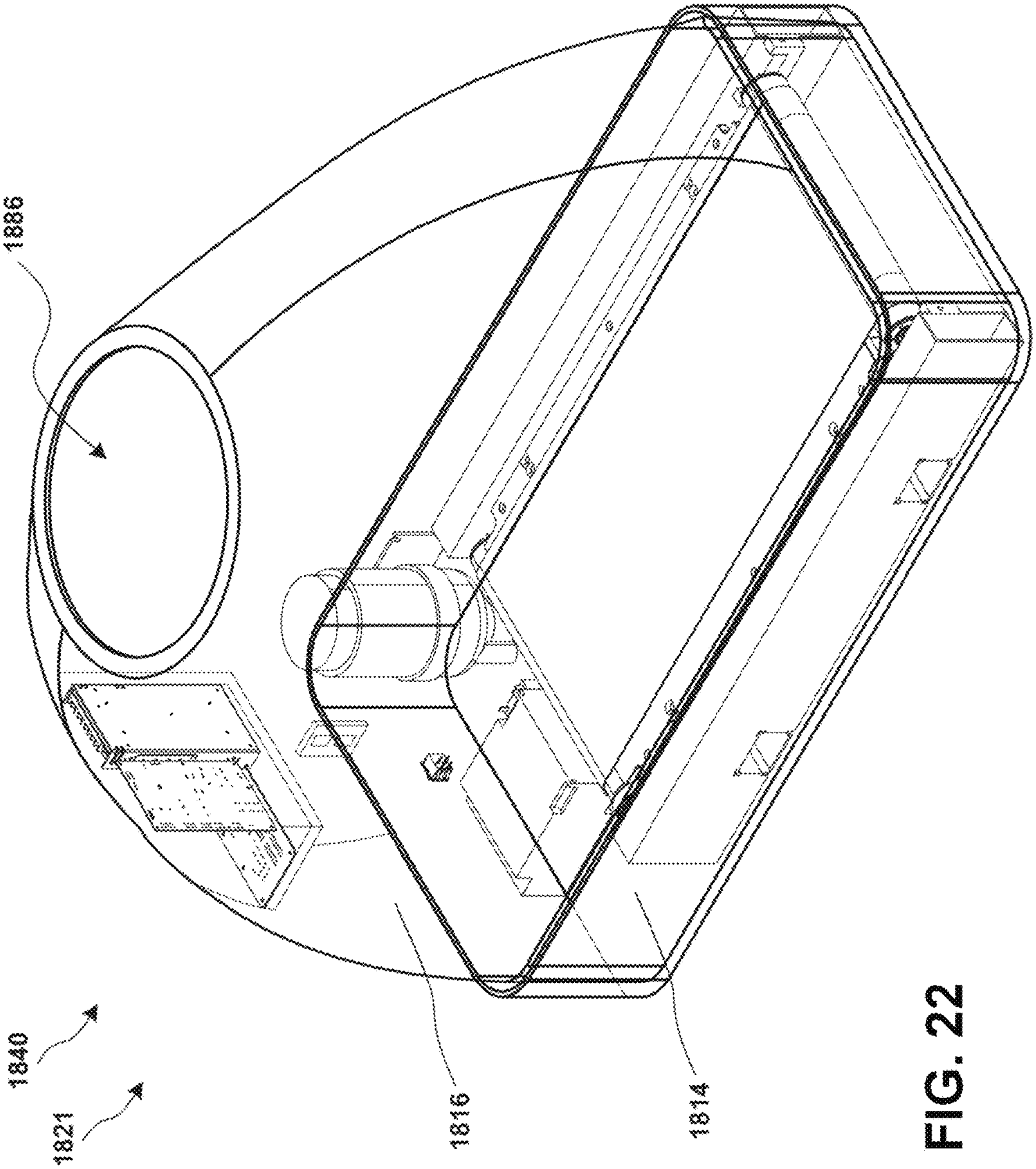
FIG. 22 is a perspective view a further example DAP system having rigid shell and an upper rigid shell as an example inflatable enclosure according to aspects, features and concepts described or shown herein.

Referring now to FIGS. 20A and 21A along with 20B, another example DAP system 1640 is shown having a step lengthening system 1665 for encouraging the user to increase a step length. The DAP system 1640 generally includes the same aspects and features as DAP systems 640, 840, 1040, 1240 and 1640 described above, or may represent the same, except regarding the step lengthening system 1665 as discussed hereafter. As such, like numbers refer to like features.

As shown, the DAP system 1640 can include one or more sensors including a position sensor that may be in the form of pair of lasers 1664 adapted for detecting a position of a lower limb of the user for the session, such as a position of a knee, a shin, a foot, and a thigh. The one or more sensors may include pairs of lasers 1664 including a left laser 1664 attached to a left side of a support platform 1642 or a rigid shell 1614 proximate a front kick region for a user and a right laser 1664 attached to the opposite right side thereof.

As can be seen in FIGS. 20A and 21A, the laser 1664 may be substantially aligned with each other width wise in a fore-aft direction and adapted to create a light beam 1666 therebetween that, when broken via a user's foot, may detect a front kick, in which either foot extends forward a set distance for the lasers and light beam. As can be seen in FIGS. 20A and 21A the left laser 1664 may be adjustably positioned forward or rearward along a laser position slot 1667 versus the right laser 1664 or vice versa for independently encouraging the user to increase either the front kick of the left foot or the right foot according to positions set for the lasers 1664. As shown in FIG. 20B, various alternative laser openings 1667 may be formed such as through a rigid shell for installing pairs of lasers 1664 or position sensors (not shown) for sensing various kick movements or other ambulation movements.

Alternatively, a rigid shell 1614 or inflatable enclosure may incorporate a translucent window through which laser light beams may pass or proximity or other sensors may detect movements or user positions from the outside of the shell through the translucent window. The lasers may be lockable in position once the position is set and may communicate to the user that a step target has been reached by triggering a light, noise, image on the screen, or other haptic or audio/visual feedback to the user that they accomplished their stepping goal. Further, such sensors may be incorporated into a fun activity or game for the user, and a score may further be created, recorded and reported that helps the encourage user participation and/or a clinician or medical team evaluate improvement or session assessment, such as the number of steps taken or at different lengths.

Dual Rigid Shells

Referring now to FIG. 22 to 25D, a DAP system 1840 having a mated pair of rigid shells is shown. DAP system 1840 generally includes the same aspect and features as the example DAP systems described above except pertaining to the pair of mated rigid shells as described hereafter. As such, like numbers refer to like features.

DAP system 1840 includes a base rigid shell 1814 secured to and/or integrated with a support platform 1842 of the DAP system having an exercise system or treadmill integrated therein and an upper rigid shell 1816 movably mated thereto that together define an inflatable enclosure therebetween. The upper rigid shell 1816 is adapted to translate upward relative to the lower shell, and this translation may be done before pressurization or may be assisted by the act of pressurizing the internal cavity between the shells.

Figure 23:
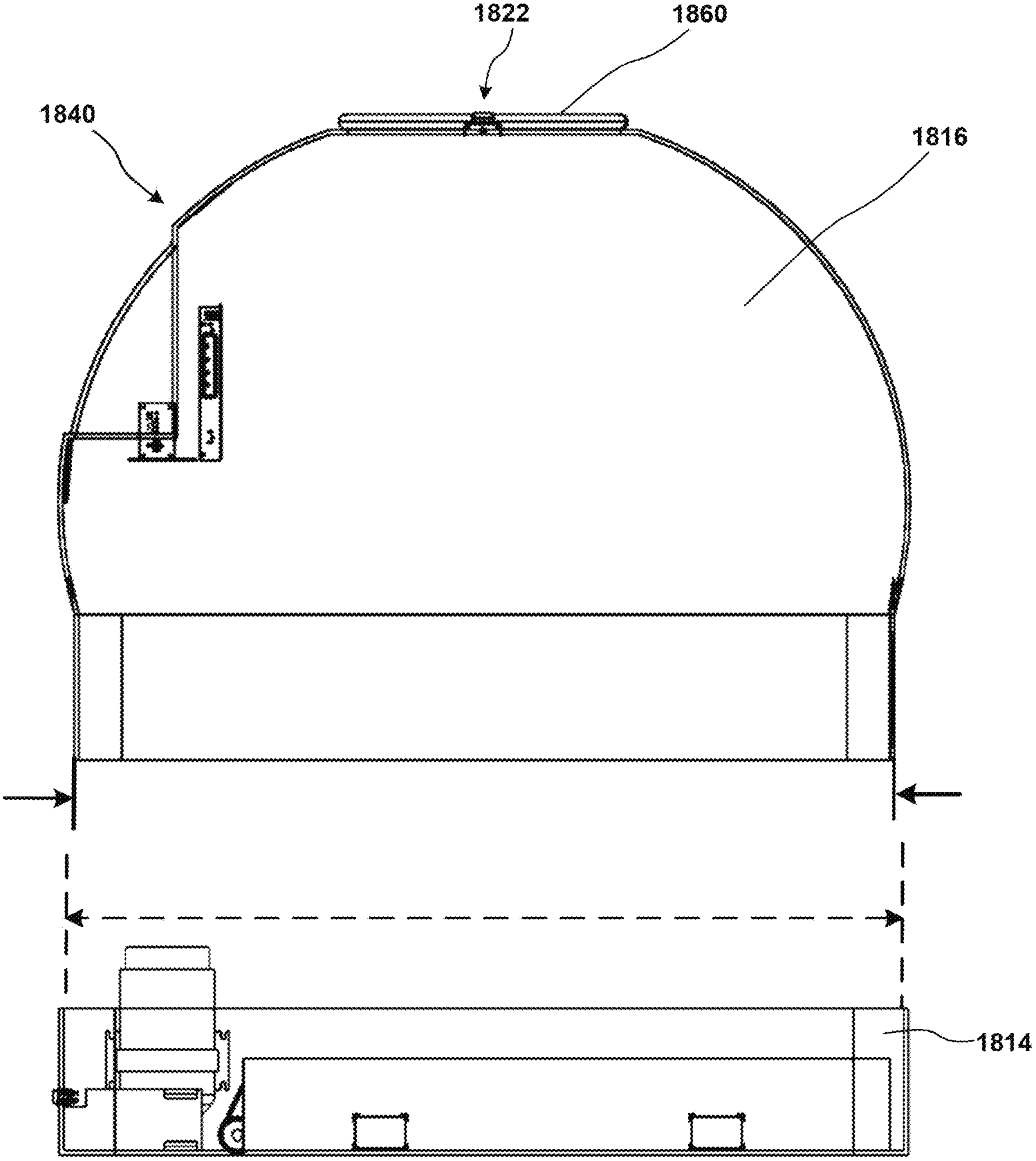
FIG. 23 is a partially exploded view showing of the example DAP system of FIG. 22 depicting the upper rigid shell having a smaller length than the lower rigid shell.
Figure 24:
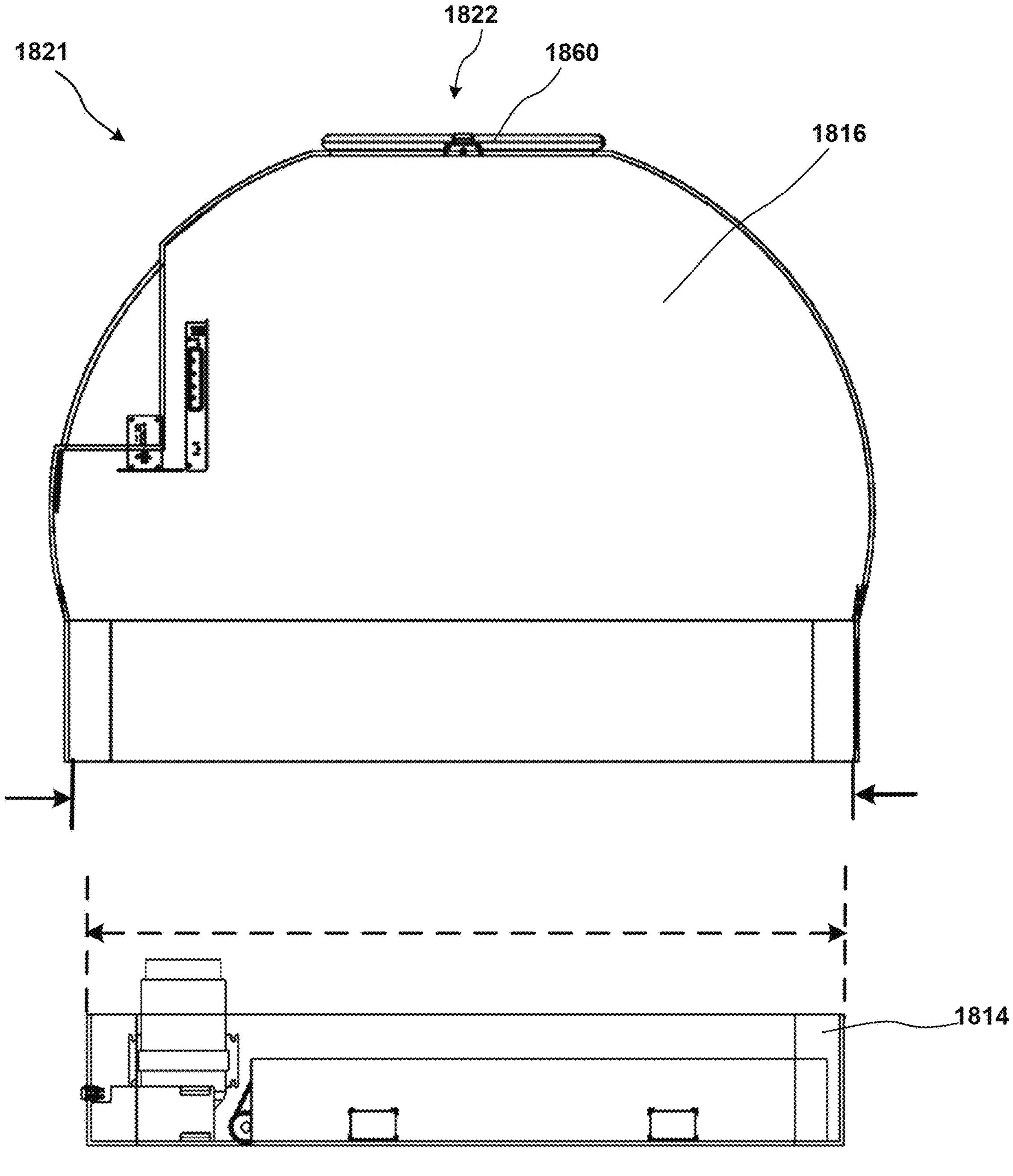
FIG. 24 is a partially exploded view showing of the example DAP system of FIG. 22 depicting the upper rigid shell having a larger length than the lower rigid shell.

A top opening 1886 can be defined through the upper rigid shell 1816 through which the user may extend for the session Together the base shell 1814, the upper rigid shell 1816, a frame element 1860, and a restrain applied thereto may form a tensioned orthotic frame 1821 operable in a similar manner as described with example DAP systems above for supporting the user in the target upright standing posture for the session. As shown in FIG. 23, the base shell 1814 may be larger than the upper rigid shell 1816, such that the upper rigid shell 1816 translates partially within the lower rigid shell 1814. Alternatively, as shown in FIG. 24, the base shell 1814 may be smaller than the upper rigid shell 1816, such that the upper rigid shell 1816 translates partially over the lower rigid shell 1814. The telescoping rigid shells can incorporate a flap seal or edge seal around the perimeter of the bottom or top edge (see FIG. 26B).

Figure 25A:
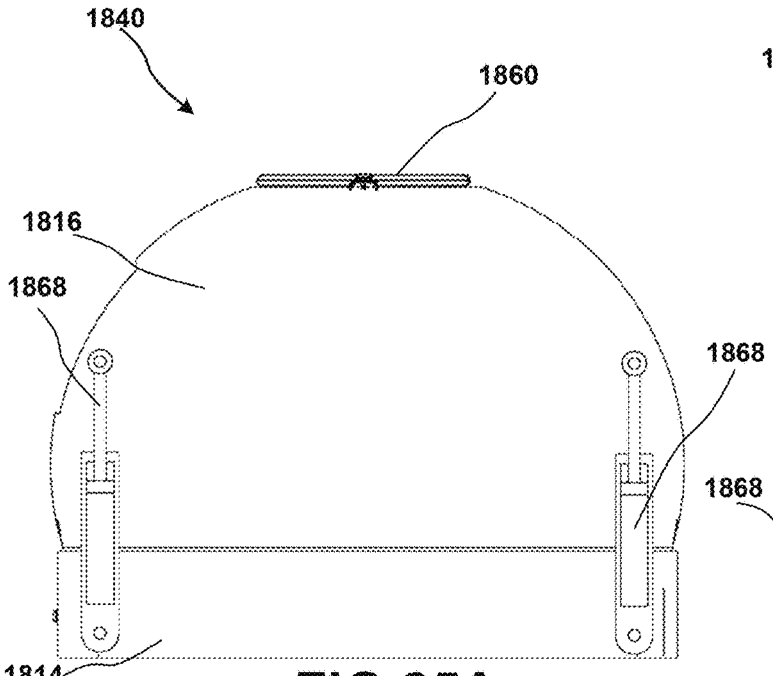
FIGS. 25A and 25C are left side views of example arrangements based on the example DAP system of FIG. 22.
Figure 25B:
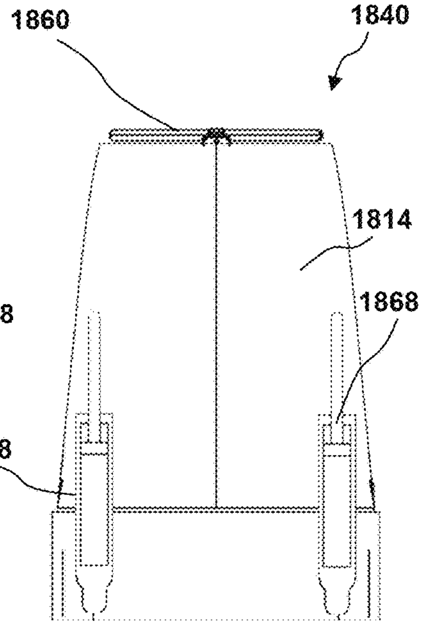
FIGS. 25B and 25D are front or rear views of example arrangements based on the example DAP system of FIG. 22.
Figure 25C:
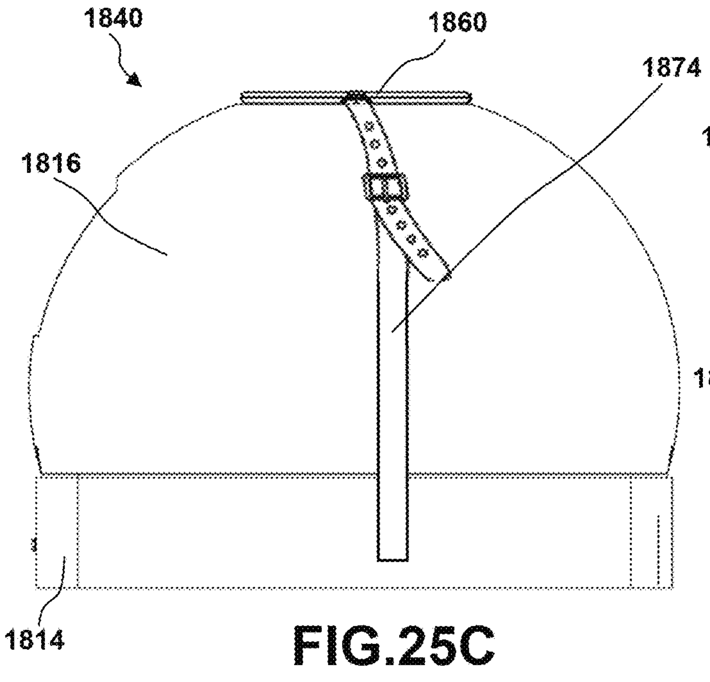
Figure 25D:
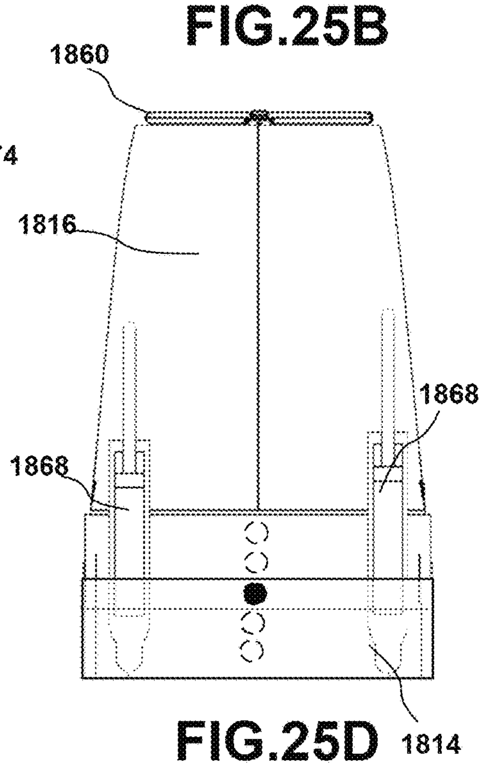
Figure 26A:
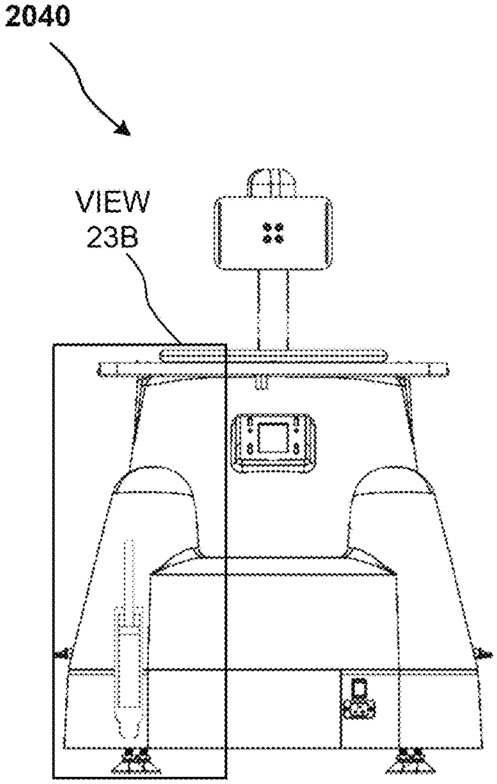
FIG. 26A is a front view of the example DAP system of FIG. 18 depicting example arrangements based on the example DAP system of FIG. 22.
Figure 26B:
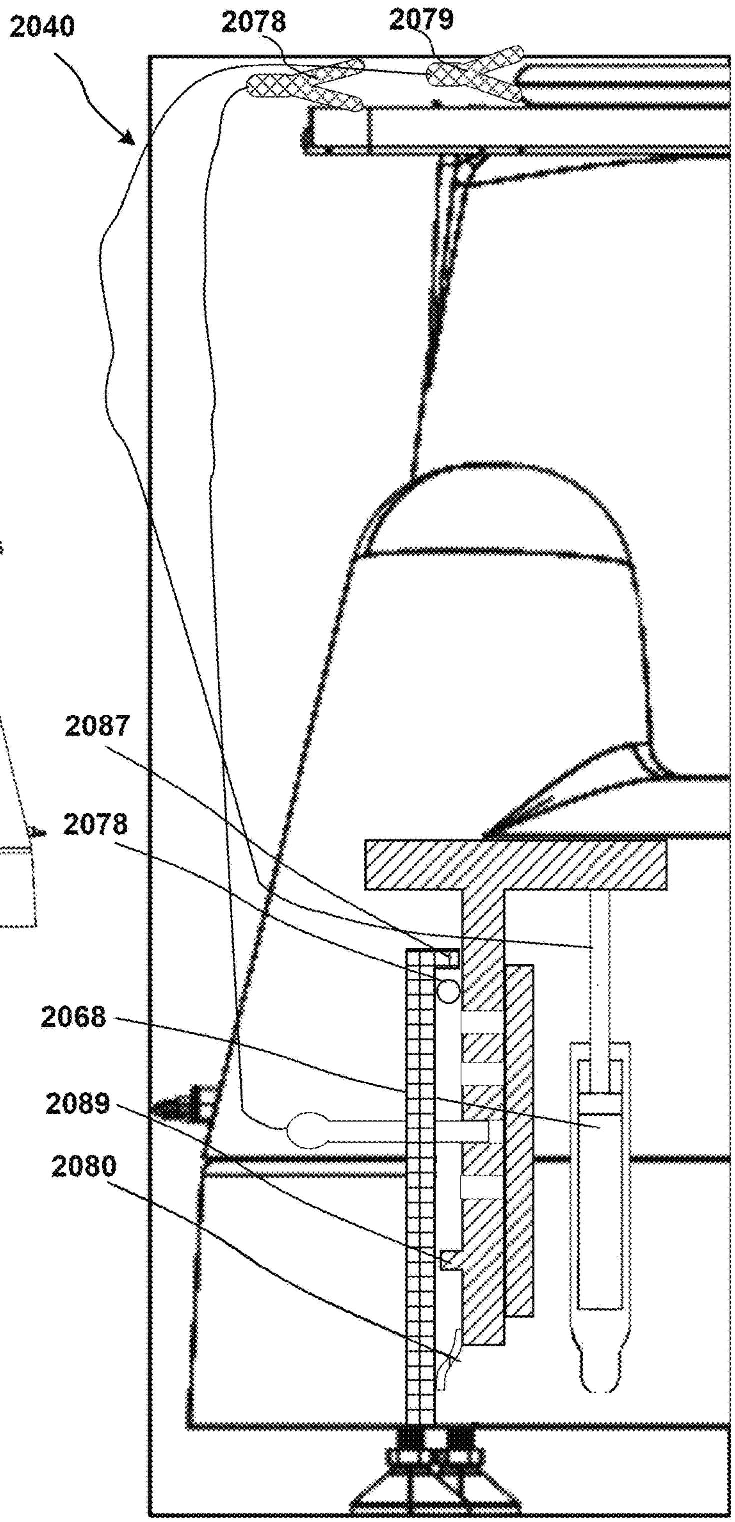
FIG. 26B is a close view of the example DAP system arrangements of FIG. 26A as indicated thereon, which depict the upper and lower rigid shells as partially transparent showing example arrangements of lift mechanisms and/or restraints according to aspects, features and concepts shown or described herein.

As shown in FIGS. 25A to 25D, the shells may include lift mechanisms 1868, which may be within a pressurized interior between the shells, or alternatively may disposed outside of the pressurized interior (see FIGS. 26A and 26B). The shells may be lockable relative to one another to lock an adjustment height of the top opening, such as via pins engaging adjustment holes between the shells as depicted in FIG. 25D. As exposed holes may leak air, a gasket (not shown) for each hole can be used which may seal the hole when a pin is not inserted to prevent air from escaping.

As shown in FIG. 25C, other forms of locking and height restraints may include the use of web strapping extending between the shells, such as about an exterior thereof. Further, internal web strapping (not shown) may be employed, such as motor-operated take up reels that limit a length of the webbing. In such arrangements, a take up reel may be mounted to either the top or bottom shell. As the motor is unwound and the webbing length is increased, the shells are allowed to expand relative to one another. As the webbing is shortened, the shells collapse and the height of the user opening relative to the floor is reduced. Cable routing schemes (not shown) may also be employed to combine multiple cables into fewer cables to reduce the number of take up reels needed.

Referring now to FIGS. 26A and 26B, a further DAP system 2040 having a mated pair of rigid shells is shown. DAP system 2040 generally includes the same aspect and features as the example DAP systems described above except pertaining to the lift mechanisms between a pair of mated rigid shells and/or seal mechanisms therebetween as described hereafter. As such, like numbers refer to like features.

Another form of locking which can also assist in the positioning of the shells is to use a lockable gas spring or constant force spring generally depicted in FIGS. 26A and 26B. In this case, the gas spring may be unlocked and sum of all the gas spring forces matched approximately to the weight of the upper shell so that it is neutrally balanced and easily moved by the user to the correct height position. Lockable gas springs may have a remote locking function accessible to the user via controller 2079 to lock their length(s) and once in position the user may then activate the lock so the position of the two shells is fixed. Alternatively, a separate locking mechanism, such as extensible lock pins controllable via a remote mechanism 2078 accessible to the user may be used such that gas springs alone may provide counterforce and unweighting or lifting functionality. Alternative to a locking gas spring, A combination of a conventional extension springs plus any of the locking systems described herein may be used to balance the weight of the top shell and make adjustments to the a height appropriate for a user.

Further, in order to ensure stability of the system and make sure the two shells don't separate under any conditions a locking ledge (not shown) may be added to create a mechanical interference between the two shells. As shown in FIG. 26B, an O-ring type seal 2078 may extend between the shells and/or one or more flap seals 2080 may seals against an inside wall of the bottom shell 2014 for an airtight junction. The seal could also be on the outer face of the top shell locking ledge in an O-ring form for example. A matching locking ledge may be affixed, either separably or integrally formed, to the top edge of the bottom shell. Such a bottom shell locking ledge may overhang to the interior of the shell and thereby mechanically restrain and hold the top shell in the bottom shell from popping out, which may be beneficial for preventing the two shells from separating at the tallest height positions.

Disguised Appearance

Figure 27:
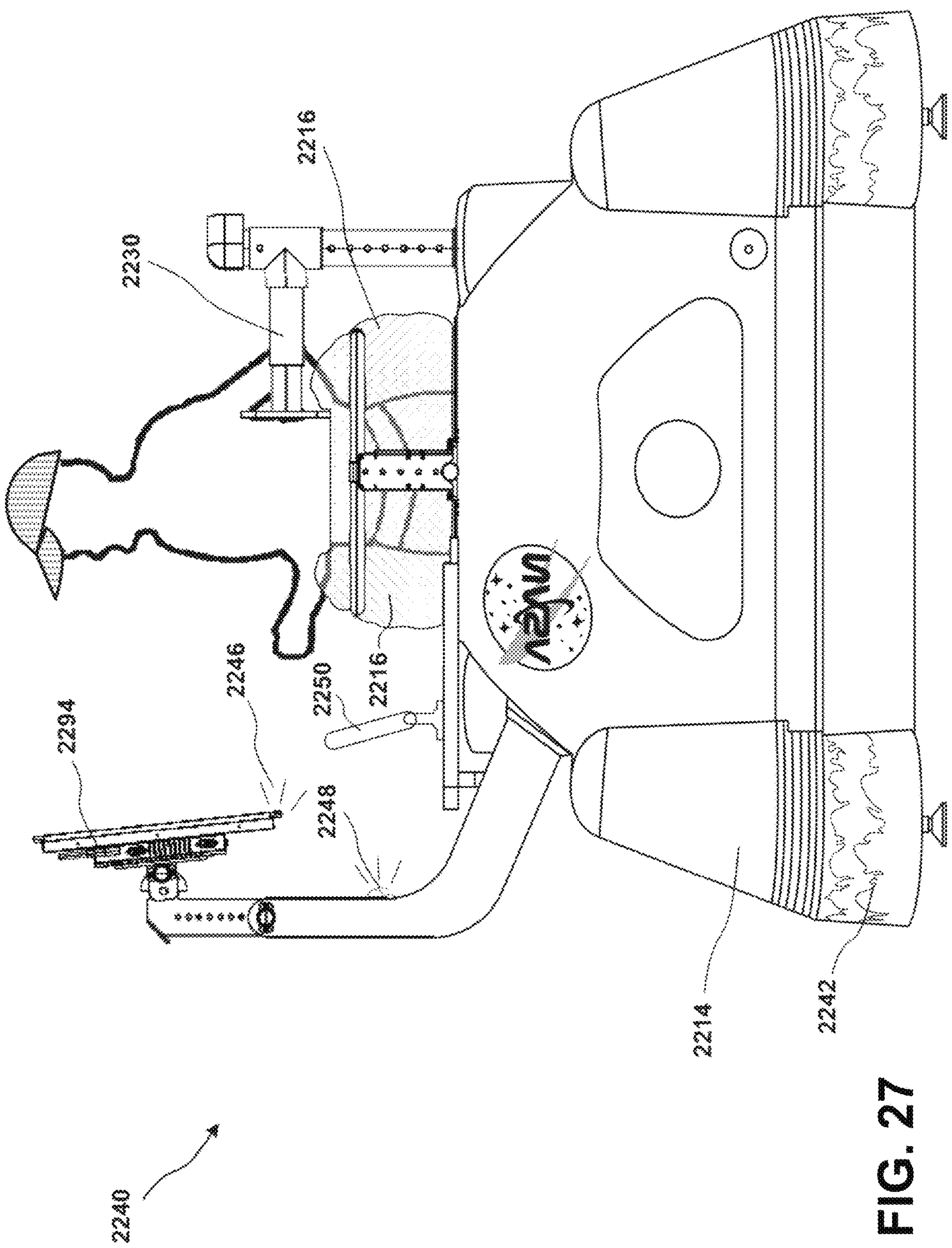
FIG. 27 is a left view of the example DAP system of FIG. 17, which may also represent the example DAP system of FIG. 8 or FIG. 13, as example amusement/disguised DAP of system according to aspects, features and concepts shown or described herein, which further show optional features including a speaker, a light source, a simulated control fixture.

Referring now to FIG. 27, a further DAP system 2240 is shown that generally includes the same aspect and features as the example DAP systems described above except pertaining to disguised appearance and/or functionality of the DAP system. As such, like numbers refer to like features.

As shown, DAP system 2240 may be configured to disguise the look of the device to make it appear more appealing for use, particularly for younger users. As such, the rigid shell 2214, the inflatable enclosure 2216, the support platform 2242 and other components may be shaped and decorated to include features, colours and/or control fixtures such that the DAP system 2240 has a user-friendly appearance such as looking like a play structure, a child's ride, and/or amusement or game system according to a corresponding theme such as looking like a dragon or other animal, a race car, spaceship or other vehicle, a carnival or amusement park ride, and the like. Further, the DAP system 2240 may be configured to produce sounds or lights and include corresponding functions, such as ride-like or game-like functions that may also include exercise-related operations. Such shaping can induce usage and reduce fear or nervousness around using the device, and increase enjoyment, compliance, and willingness to perform related exercise actions. The applicant has witnessed firsthand how encouraging youths who are initially hesitant by referring to the device as their space ship or submarine and donning clothes that are their space suit or diving suit, changes the experience from one of hesitation to one of excitement and fun.

Further, an outer surface of the DAP system, such as an exterior of the rigid shell 2214 and support platform may also be drawable such as with a dry erase surface allowing user customization or decoration. The surface may be decorated at designated drawing locations or the entire surface may be drawable with erasable markers. In keeping with the theme of a disguised device, creating a drawable/erasable surface may encourage a child, for example, to interact with the device, become familiar with it, leave notes of encouragement for others, and general create a connection with the device so that they want to use it more and more. As stated elsewhere in this application the ability to disguise an activity that is not enjoyable and make it fun can produce exponentially more profound results than conventional training or exercise methods.

Further. the DAP system 2240 may include simulated control fixtures corresponding with the disguise theme, such as a control stick 2250 for a rocket ship consistent with a DAP system having an appearance of a rocket. Audio visual features corresponding with the disguise may be included, such as rocket sounds and attached flashing lights. The monitor/control interface 2294 can be adapted to show images corresponding with the disguise theme, such as depicting a take-off sequence or ride in a moon vehicle. In the case of the rocket ship, a video can play on the screen for example with a countdown of T-X seconds followed by showing a rocket ship lifting off for spaceflight and potentially a video of astronauts talking during the flight. Further, corresponding system operations, such as applying unweight for the user may correspond with the theme, such being related to a simulated moon walk. Thus, exercise-related functions can also be disguised as part of the simulated ride or game theme. In addition, customized user seal garments can be used having an appearance matching the disguise them, such user shorts simulating a portion of a spacesuit.

As mentioned earlier, other themes can be similarly employed, for example the shape of the shell like a dinosaur where the child can feel like they are riding on the dinosaur's back or riding a horse as depicted in FIG. 6. The shape of the shell and non-functional protrusions or shapes of the shell can resemble a head of the dinosaur for example can be added to give the child the feeling they are riding an amusement ride. Sounds like the dinosaur roaring may be provided via a speaker 2246, or lights 2248 may blink when the treadmill is moving for example, which may may enhance the enjoyment and disguise the exercise machine as a young user plays along with simulations during the session, which can encourage usage and improve physical progress.

In this way, visual, audio, and physical attributes can be adjusted and manipulated to disguise the DAP system as something else to promote fun and usage along with reducing or eliminating reluctance for using the system, whereas children otherwise may typically not continue with therapy sessions. This was observed by the applicants as well in that a typical usage time in an unweighting treadmill for a child might be approximately 10 min before getting bored and losing compliance. With the applicant's invention, a child that previously exercised only 10 min had so much fun, they didn't even want to exit after 40 min of usage. Consequently, the measured results in outcome are dramatically more profound in a good way than traditional unweighting therapy. In this way a method of respiratory conditioning may be performed with users where they are encouraged to move for longer periods of time or for faster speeds in order to improve their physical conditioning. A therapist may then set goals or targets that manifest as physical responses from the DAP system which inspire the patient to work harder and/or longer.

Low Height User Method

Figure 28:
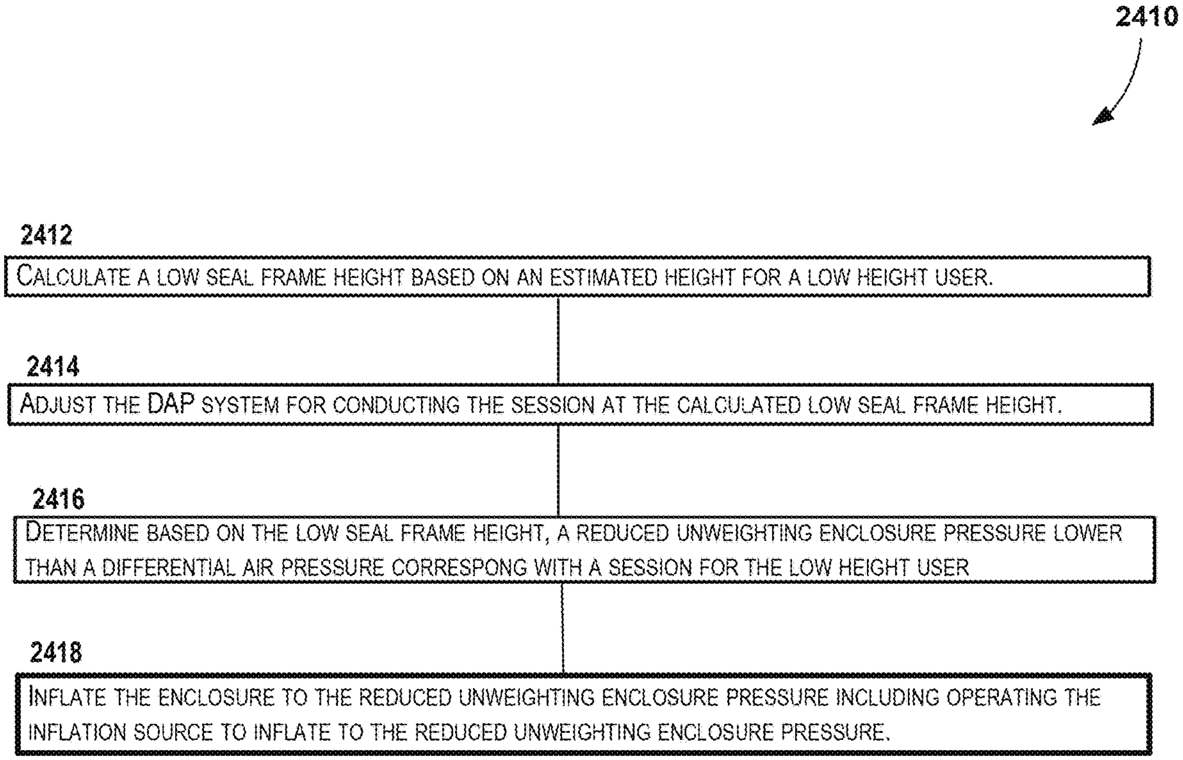
FIG. 28 is a schematic representation of an example method of controlling a DAP system for an exercise session of a low-height user according to aspects, features and concepts shown or described herein.

Referring now to FIG. 28, a method 2410 of operating a DAP system for a low height user may include an action 2412 of calculating a low seal frame height for a low height user. Further, the method may include an action 2414 of adjusting the DAP system for conducting an exercise session, which as described above may be controlled by a therapist, clinician, parent or other person on behalf of the low height user. The method may further include the action 2418 of inflating the enclosure to a reduced or minimum unweighting pressure and the clinician increasing the pressure as appropriate during the session below a pre-determine maximum pressure in relation to the height of the low height user, in which the maximum pressure is determined to be low enough that it will not fully unweight the user.

For example with a user opening positioned approximate 24 inches above the running surface the maximum pressure may be as low as 15 mmHg. For a user opening height of 30 inches above the running surface he maximum operation pressure may be 25 mmHg. Further still, the method includes defining a scale between ambient pressure and this maximum operating pressure and optionally creating a linear scaling between these two points which translate to a range of settings on a user interface. For example, if the maximum pressure for the low height user with height setting of 21" is 20 mmHg, a user interface range may have a scale of 100 discreet settings between 0-100 where each increment corresponds to 20 mmHg/100=0.2 mmHg per setting increment. The DAP system would recognize that a low height user is inside the machine based on the actual height setting of the DAP system prior to inflation, and would implement this low height user control system, and optional different user interface, to ensure that pressure is applied to unweight the low height user, safely and consistently from one session to the next.

For example certain steps that may normally be done like selecting a shorts size or a height, or taking a weight measurement may be skipped entirely and the user allowed to exercise solely based on the scale and setting values that were pre-determined. Such operating method may dramatically expand the range of users for which an DAP system may be usable. For example prior art devices operate with a minimum user height typically above 4 ft 10 inches. Such systems are not configured to operate below this range because the physical dynamics of the system do not allow for it. For example, conventional systems are known to have a minimum user weight requirement of around 90 lbs. Therefore, low height users such as dwarves or children may not be able to take advantage of such systems.

Further, such systems do not have capability to set and maintain the height of the DAP system as such a low height because the height adjustment system is not capable of locking in at such a height. Therefore but implementing a method to enable usage of the DAP system for low height users may greatly increase the quantity and range of users that may use the system. A further important aspect of this method is that it maintains safety for the low height user as the amount of unweighting they experience is much more sensitive to pressure, meaning for a given amount of pressure, they are unweighted to a greater extent. Therefore, a system and method that recognize and account for a low height user differently than a normal height user is imperative to ensure they are not accidentally ejected from the device.

The subject matter described above is provided by way of illustration only and should not be construed as limiting. Various modifications and changes can be made to the subject matter described herein without following the example arrangements, embodiments and applications illustrated and described, and without departing from the true spirit and scope of the embodiments, arrangements, or of the concepts and technologies disclosed herein.

Although various arrangements and embodiments have been described as having particular features and/or combinations of components, other embodiments and arrangements are possible having a combination of any features and/or components from any of embodiments or arrangements as discussed above. Aspects have been described in the general context of exercise devices, and more specifically supplemental lifting, unweighting or differential air pressures mechanisms, devices, systems, and methods for exercise devices, but inventive aspects are not necessarily limited to use with exercise devices.

We claim:

1. An assistive amusement system adapted to enable and motivate user participation in exercise session activities of a Differential Air Pressure (DAP) system substantially disguised as a play system, the DAP system having a support platform with a treadmill integrated therein, the assistive amusement system comprising:

an inflatable enclosure secured at a base end to the support platform and extending upward therefrom in an inflated state to a vertical height for an exercise session, the inflatable enclosure having shape features in the inflated state corresponding with a disguise of the play system;

a restraint securely connected to the support platform at a base portion and connected to a top opening defined through an upper region of the inflatable enclosure, the restraint adapted to restrain the top opening at a vertical height in an inflated state; and a control computer adapted to control the DAP system to perform operations corresponding with the disguise of the play system, the operations comprising at least partially unweighting a user for the exercise session.

2. The assistive amusement system of claim 1, wherein the control computer is further adapted to perform additional operations comprising:

one of inclining or declining the treadmill;

operating the treadmill at a speed faster than an ambulation speed of the user without unweighting; and one of increasing or decreasing partial unweighting applied to the user.

3. The assistive amusement system of claim 2, further comprising:

a user tray attached to a forward region of the assistive amusement system that is accessible by the user during the exercise session;

wherein:

the assistive amusement system further comprises a simulated control fixture corresponding with the disguise of the play system; and the additional operations are performed in response to one of: user movements of the simulated control fixture, exercise movements during the exercise session, or user interactions with items on the user tray.

4. The assistive amusement system of claim 1, the inflatable enclosure comprising one of:

a flexible inflatable enclosure secured at a base to the support platform and defining the top opening at an upper region opposite the base, the flexible inflatable enclosure extending upward therefrom in the inflated state;

a rigid base shell secured to the support platform and a flexible inflatable enclosure connected to an upper portion of the rigid base shell, the flexible inflatable enclosure defining the top opening at an upper region thereof, the top opening of the flexible inflatable enclosure extending upward from the rigid base shell to the vertical height in the inflated state; or a rigid base shell secured to the support platform and an upper shell connected to an upper portion of the rigid base shell, the upper shell defining the top opening through an upper region thereof, the upper shell vertically movable with respect to the rigid base shell when inflated, the top opening of the upper shell extending upward from the rigid base shell to the vertical height in the inflated state.

5. The assistive amusement system of claim 1, wherein the DAP system is disguised as a child's ride corresponding to one of: a vehicle, a cartoon character, a superhero, an amusement ride, or an animal disguise, wherein the vehicle comprises one of a spaceship, a rocket, an airplane, an automobile, or a motorcycle.

6. The assistive amusement system of claim 1, further comprising at least one of:

a user-customizable rigid wall portion about a portion of the support platform having a drawable and erasable coating on an outer surface of the user-customizable rigid wall portion;

a speaker adapted to generate sounds corresponding with one of: the disguise of the play system; or music or sounds selected according to the user;

a light source adapted to generate lights corresponding with one of: the disguise of the play system; or light patterns, colors, or displays selected according to the user; or a simulated control fixture corresponding with the disguise of the play system, wherein the simulated control fixture comprises one of: a control stick, a steering wheel, a bridle, or a saddle corresponding with the disguise of the play system.

7. The assistive amusement system of claim 1, further comprising:

a regulated pressure source integrated with the treadmill; and a microprocessor adapted to minimize noise from the regulated pressure source by regulating a speed of a fan of the regulated pressure source and adjusting the speed thereof to reduce fan sounds while maintaining a desired pressure;

wherein the control computer is further configured to perform operations comprising:

simulating one of a moon bounce and a low gravity environment with little or no ambulation;

maintaining a static position for the treadmill; and controlling the regulated pressure source to reduce noise while maintaining a desired unweighting level during simulation of the moon bounce or the low gravity environment.

8. The assistive amusement system of claim 1, further comprising:

a step lengthening system for cooperating with disguised operations conducted while the user is partially unweighted and adapted to encourage the user to increase a step length, the step lengthening system comprising at least one of:

a position sensor for sensing a position of a lower limb body part comprising at least one of a knee, a shin, a foot, or a thigh, the position sensor comprising one of: a proximity sensor and a laser beam sensor operatively connected to the DAP system and adapted to detect a proximity of the lower limb body part to a target position, wherein a proximity setting for a location and an orientation is adjustable to modify the target position; and a laser beam operatively connected to the assistive amusement system and adjustable for detecting when the lower limb body part has reached the target position and alerting one of the assistive amusement system or the user, wherein the alerting is adapted to encourage the user to increase the step length.

9. The assistive amusement system of claim 1, further comprising a clinician control interface adjustably attached to a portion of the DAP system inaccessible to the user and readily accessible to a person proximate the DAP system;

wherein a user accessible control interface is adapted for selective deactivation by the person, such that the user is unable to control DAP system operations while system operations are controllable via the clinician control interface.

* * * * *